US011151698B2

(12) United States Patent
Suzuki

(10) Patent No.: US 11,151,698 B2
(45) Date of Patent: Oct. 19, 2021

(54) IMAGE PROCESSING APPARATUS AND METHOD FOR SUPPRESSING OVERLAP BLUR AND INDIVIDUAL BLUR FROM PROJECTION IMAGES USING AN INVERTED FILTER

(71) Applicant: SONY CORPORATION, Tokyo (JP)

(72) Inventor: Takaaki Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 48 days.

(21) Appl. No.: 16/488,110

(22) PCT Filed: Mar. 15, 2018

(86) PCT No.: PCT/JP2018/010164
§ 371 (c)(1),
(2) Date: Aug. 22, 2019

(87) PCT Pub. No.: WO2018/180530
PCT Pub. Date: Oct. 4, 2018

(65) Prior Publication Data
US 2020/0065943 A1   Feb. 27, 2020

(30) Foreign Application Priority Data
Mar. 28, 2017 (JP) .............................. JP2017-062304

(51) Int. Cl.
*G06T 5/00* (2006.01)
*G06T 3/00* (2006.01)
(Continued)

(52) U.S. Cl.
CPC ............ *G06T 5/003* (2013.01); *G06T 3/0093* (2013.01); *G06T 5/20* (2013.01); *H04N 9/3185* (2013.01)

(58) Field of Classification Search
CPC .. G06T 5/00; G06T 5/003; G06T 5/20; G06T 3/40; G06T 3/0093; H04N 9/3185;
(Continued)

(56) References Cited

U.S. PATENT DOCUMENTS 8,017,897 B2 *  9/2011  Tanaka ................. H04N 9/3147
                                                   250/208.1
9,438,872 B2 *  9/2016  Lin ....................... H04N 9/3147
(Continued)

FOREIGN PATENT DOCUMENTS

CN        1825196 A    8/2006
CN     101006721 A    7/2007
(Continued)

OTHER PUBLICATIONS

Brown, et al., "Image Pre-conditioning for Out-of-Focus Projector Blur", 2006 IEEE Computer Society Conference on Computer Vision and Pattern Recognition, vol. 2, 2006, 08 pages.
(Continued)

*Primary Examiner* — Chan S Park
*Assistant Examiner* — Claude Noel Y Zanetsie
(74) *Attorney, Agent, or Firm* — Chip Law Group

(57) ABSTRACT

The present disclosure relates to an image processing apparatus and a method that allow suppression of a reduction in the subjective image quality. An inverse filter of a filter configured to transform an input image to be projected by a plurality of projection sections into a projection image projected by the plurality of projection sections is generated on the basis of an individual-blur amount and a superimposition-blur amount. The individual-blur amount indicates a magnitude of optical blur generated in an individual projection image projected by each of the plurality of projection sections. The superimposition-blur amount indicates a magnitude of optical blur generated from superimposition of a
(Continued)

plurality of the projection images. The input image is transformed using the generated inverse filter to generate a phase image. The present disclosure can be applied to, for example, an image processing apparatus, an image projection apparatus, a control apparatus, an information processing apparatus, a projection imaging system, an image processing method, a program, or the like.

20 Claims, 15 Drawing Sheets

(51) Int. Cl.
*G06T 5/20* (2006.01)
*H04N 9/31* (2006.01)

(58) Field of Classification Search
CPC .......... H04N 5/74; G03B 21/00; G03B 21/10; G03B 2207/00; G03B 2207/005
See application file for complete search history.

(56) References Cited

U.S. PATENT DOCUMENTS

| | | | | |
|---|---|---|---|---|
| 2002/0024640 | A1* | 2/2002 | Loka | H04N 9/3147 353/94 |
| 2005/0206857 | A1* | 9/2005 | Yamada | G03B 21/56 353/94 |
| 2007/0286514 | A1* | 12/2007 | Brown | H04N 9/3179 382/254 |
| 2008/0260292 | A1 | 10/2008 | Tanaka et al. | |
| 2016/0037147 | A1 | 2/2016 | Kempf et al. | |
| 2016/0295183 | A1 | 10/2016 | Yamaguchi et al. | |
| 2017/0059977 | A1 | 3/2017 | Ogino | |

FOREIGN PATENT DOCUMENTS

| | | |
|---|---|---|
| CN | 101015218 A | 8/2007 |
| CN | 101291408 A | 10/2008 |
| CN | 102457681 A | 5/2012 |
| CN | 103026381 A | 4/2013 |
| CN | 103327274 A | 9/2013 |
| CN | 107409192 A | 11/2017 |
| EP | 1983746 A2 | 10/2008 |
| EP | 2866073 A1 | 4/2015 |
| JP | 2005-269528 A | 9/2005 |
| JP | 2008-268557 A | 11/2008 |
| JP | 2009-008974 A | 1/2009 |
| JP | 2016-197145 A | 11/2016 |
| WO | 2016/157670 A1 | 10/2016 |

OTHER PUBLICATIONS

Brown, et al., "Image Pre-conditioning for Out-of-Focus Projector Blur", Computer Society Conference on Computer Vision and Pattern Recognition (CVPR'06), IEEE, Oct. 9, 2006, 08 pages.
International Search Report and Written Opinion of PCT Application No. PCT/JP2018/010164, dated Jun. 5, 2018, 09 pages of ISRWO.
Brown, et al., "Image Pre-conditioning for Out-of-Focus Projector Blur", IEEE, Computer Society Conference on Computer Vision and Pattern Recognition (CVPR'06), Jun. 17-22, 2006, 08 pages.
Dyamada, et al., "Focal Pre-Correction of Projected Image for Deblurring Screen Image", IEEE, Conference on Computer Vision and Pattern Recognition, Jun. 17-22, 2007, 8 pages.
Xiuhui, et al. , "Research on Anisotropy problems under rear-projection multi-projector tiled display wall", Journal of mage and Graphics, vol. 20, No. 4, Apr. 2015, 07 pages.
Office Action for CN Patent Application No. 201880019642.2, dated Jul. 2, 2021, 09 pages of English Translation and 04 pages of Office Action.

\* cited by examiner

IMAGE PROCESSING APPARATUS AND METHOD FOR SUPPRESSING OVERLAP BLUR AND INDIVIDUAL BLUR FROM PROJECTION IMAGES USING AN INVERTED FILTER

CROSS REFERENCE TO RELATED APPLICATIONS

This application is a U.S. National Phase of International Patent Application No. PCT/JP2018/010164 filed on Mar. 15, 2018, which claims priority benefit of Japanese Patent Application No. JP 2017-062304 filed in the Japan Patent Office on Mar. 28, 2017. Each of the above-referenced applications is hereby incorporated herein by reference in its entirety.

TECHNICAL FIELD

The present disclosure relates to an image processing apparatus and a method, and particularly relates to an image processing apparatus and a method that allow suppression of a reduction in the subjective image quality.

BACKGROUND ART

In related art, there have been a video display system that uses a plurality of projectors to realize projection on a large screen and a video display system that uses a plurality of projectors to improve the brightness, a sense of resolution, and the like of a projection image, compared with using one projector. In these video display systems, there is a so-called overlap area in which videos from the plurality of projectors are superimposed on each other and projected in a projection area of the projectors. There have been cases where a projection image in the overlap area includes blur (superimposition blur) generated due to deviation of positioning between projection images from the plurality of projectors.

A method considered to suppress this superimposition blur, for example, uses a feedback loop to adjust correction so as to minimize the difference between a superimposed image to be projected and an input image (See PTL 1, for example).

Further, there have been cases where blur (individual blur) occurs even in a single projection image. For example, there have been cases where diffuse reflection of light from the projector on a projection surface on which an image is projected causes blur, cases where a change in depth of the projection surface causes blur (so-called out-of-focus blur), and cases where a projector lens or a light source causes optical blur. A method considered to suppress this individual blur, for example, uses a camera to perform PSF estimation for the individual blur at the time of projection and designs an inverse filter using the obtained blur amount to project an input image to which the filter has been applied (See NPL 1, for example).

CITATION LIST

Patent Literature

[PTL 1]
Japanese Patent Laid-Open No. 2009-8974

Non Patent Literature

[NPL 1]
M. S. Brown, P. Song and T.-J. Cham: "Image preconditioning for out-of-focus projector blur," Proceedings of the 2006 IEEE Computer Society Conference on Computer Vision and Pattern Recognition (CVPR'06), pp. 1956-1963 (2006).

SUMMARY

Technical Problems

Generally, however, in many cases, both the above-described superimposition blur and individual blur occur in the overlap area between the projection images. With the method described in PTL 1, it takes a long time for the correction to be converged since this method involves feedback loop processing. Therefore, it has been difficult to cope with the occurrence of deviation, for example. Further, there is also a possibility that the result does not converge to a true value. For example, there has been a risk that an attempt to suppress processing time increases the possibility of not converging to an optimal solution. Further, it has been difficult to suppress the superimposition blur with the method described in NPL 1.

The present disclosure has been made in view of these circumstances and allows suppression of a reduction in the subjective image quality.

Solution to Problems

An image processing apparatus according to one aspect of the present technology includes: an inverse filter generating section configured to generate, on the basis of an individual-blur amount and a superimposition-blur amount, an inverse filter of a filter configured to transform an input image to be projected by a plurality of projection sections into a projection image projected by the plurality of projection sections, the individual-blur amount indicating a magnitude of optical blur generated in an individual projection image projected by each of the plurality of projection sections, the superimposition-blur amount indicating a magnitude of optical blur generated from superimposition of a plurality of the projection images; and a phase image generating section configured to transform the input image using the inverse filter generated by the inverse filter generating section to generate a phase image.

The inverse filter generating section can generate the filter such that an error between a value obtained by filtering the input image and the projection image of the input image is minimized, and generate the inverse filter using the generated filter.

The inverse filter generating section can generate a Wiener filter as the inverse filter.

The inverse filter generating section can generate the inverse filter for each of the projection sections.

The inverse filter generating section can generate the inverse filter for a representative pixel of the input image.

The inverse filter generating section can generate the inverse filter for all pixels of the input image.

The phase image generating section can generate the phase image for each of the projection sections.

The phase image generating section can transform the entire input image using the inverse filter generated by the inverse filter generating section to generate the phase image for the entire input image.

The phase image generating section can transform a part of the input image using the inverse filter generated by the inverse filter generating section to generate the phase image for the part of the input image.

The phase image generating section can omit transformation of other parts of the input image.

The phase image generating section can transform other parts of the input image such that the individual-blur amount is reduced.

An individual-blur amount calculating section configured to calculate the individual-blur amount on the basis of a captured image obtained by capturing the individual projection image projected by each of the plurality of projection sections can be further included.

The individual-blur amount calculating section can project a test image from each of the plurality of projection sections and calculate a point spread function (PSF) as the individual-blur amount for the test image in a captured image obtained by capturing a projection image of the test image.

A superimposition-blur amount calculating section configured to calculate the superimposition-blur amount on the basis of a captured image obtained by capturing the individual projection image projected by each of the plurality of projection sections can be further included.

The superimposition-blur amount calculating section can obtain projection coordinates of each pixel of the projection image from the captured image and calculate, from the projection coordinates, the superimposition-blur amount for a part in which the plurality of the projection images is superimposed on each other.

An imaging section configured to capture the individual projection image projected by each of the plurality of projection sections can be further included.

The plurality of projection sections each configured to project an image can be further included.

The plurality of projection sections can each project the phase image generated by the phase image generating section.

The plurality of projection sections can each project the image at a mutually shifted position such that the projection image has a higher resolution than the image projected by each of the projection sections.

An image processing method according to one aspect of the present technology includes: generating, on the basis of an individual-blur amount and a superimposition-blur amount, an inverse filter of a filter configured to transform an input image to be projected by a plurality of projection sections into a projection image projected by the plurality of projection sections, the individual-blur amount indicating a magnitude of optical blur generated in an individual projection image projected by each of the plurality of projection sections, the superimposition-blur amount indicating a magnitude of optical blur generated from superimposition of a plurality of the projection images; and transforming the input image using the generated inverse filter to generate a phase image.

In an image processing apparatus and a method according to one aspect of the present technology, an inverse filter of a filter configured to transform an input image to be projected by a plurality of projection sections into a projection image projected by the plurality of projection sections is generated on the basis of an individual-blur amount and a superimposition-blur amount. The individual-blur amount indicates a magnitude of optical blur generated in an individual projection image projected by each of the plurality of projection sections. The superimposition-blur amount indicates a magnitude of optical blur generated from superimposition of a plurality of the projection images. The input image is transformed using the generated inverse filter to generate a phase image.

Advantageous Effect of Invention

According to the present disclosure, an image can be processed. Particularly, a reduction in the subjective image quality can be suppressed.

DESCRIPTION OF EMBODIMENTS

Figure 1:
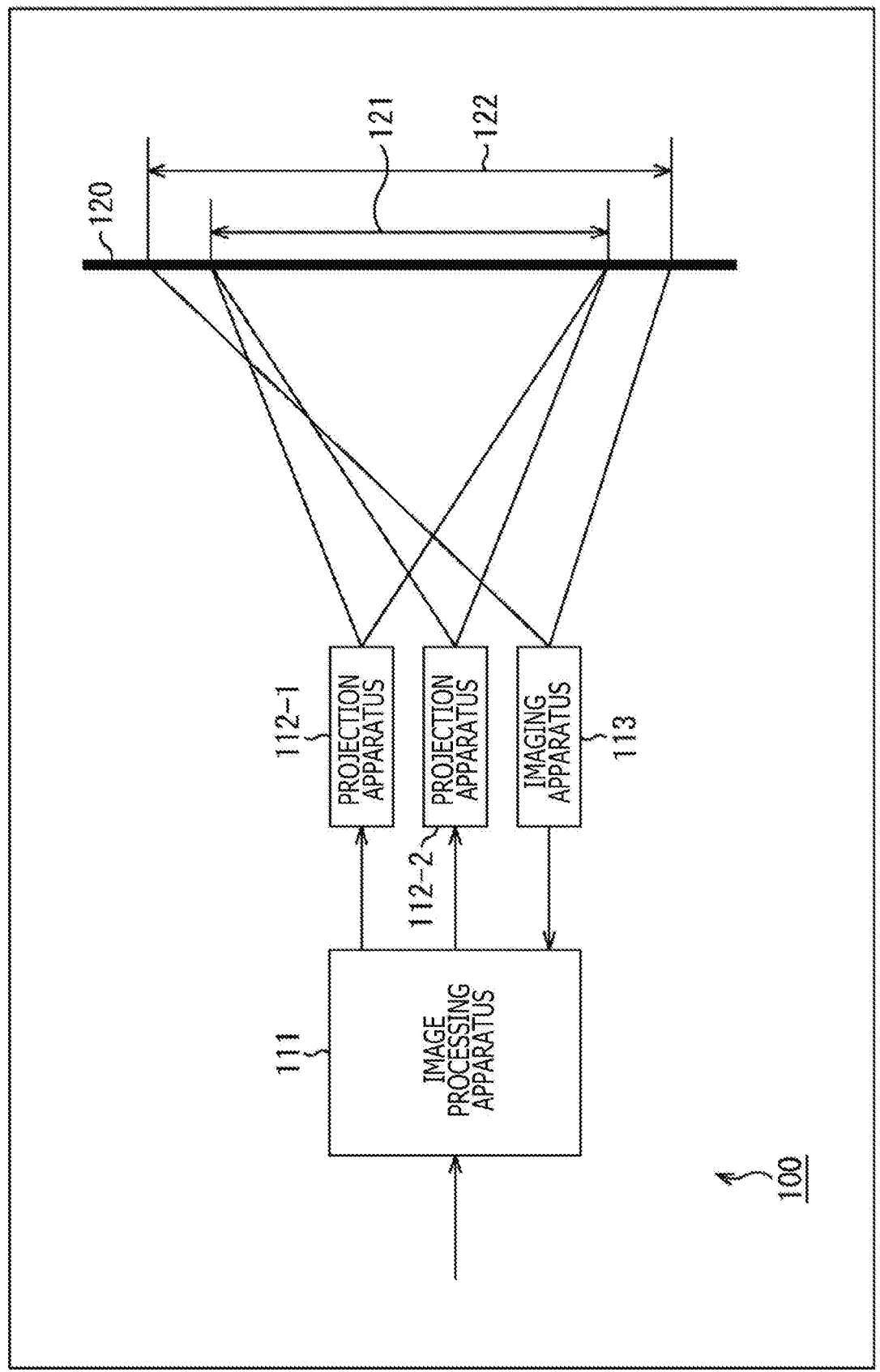
FIG. 1 is a block diagram illustrating an example of a main configuration of a projection imaging system.

Hereinafter, modes for carrying out the present disclosure (hereinafter referred to as embodiments) will be described. It is noted that the description will be given in the following order.

1. Blur Generated in Projection Images and Measures against Blur

2. First Embodiment (Projection Imaging System/Superimposing Overall Projection Images)

3. Second Embodiment (Projection Imaging System/Partially Superimposing Projection Images)

4. Third Embodiment (Projection Imaging System/Increasing Resolution of Projection Images)

5. Fourth Embodiment (Projection Imaging System/Other Examples of Configuration)

6. Others

1. Blur Generated in Projection Images and Measures Against Blur

<Reduction in Subjective Image Quality of Projection Images Due to Optical Blur>

In related art, there have been cases where optical blur occurs in a projection image projected by a projector. The optical blur is a phenomenon in which an image is optically blurred (a phenomenon in which an image becomes unclear).

For example, there is a video display system that uses a plurality of projectors to realize projection on a large screen and a video display system that uses a plurality of projectors to improve the brightness, a sense of resolution, and the like of a projection image, compared with using one projector. In these video display systems, there is a so-called overlap area in which videos from the plurality of projectors are superimposed on each other and projected in a projection area of the projectors. There have been cases where a projection image in the overlap area includes optical blur (also referred to as superimposition blur) generated due to deviation of positioning between projection images from the plurality of projectors.

Further, there have been cases where optical blur (also referred to as individual blur) also occurs in each of the superimposed projection images. For example, there have been cases where diffuse reflection of light from a projector on a projection surface on which an image is projected causes blur, cases where a change in depth of the projection surface causes blur (so-called out-of-focus blur), and cases where a projector lens or a light source causes blur.

In many cases, generally, both the above-described superimposition blur and individual blur of each projection image occur in the overlap area between the projection images. There has been a risk that the occurrence of such optical blur in a projection image reduces the subjective image quality in the projection image.

For example, a method of suppressing individual blur described in NPL 1 uses a camera to estimate a PSF (Point Spread Function) for individual blur at the time of projection and designs an inverse filter using the obtained blur amount to project an input image to which the filter has been applied.

With this method, however, it has been difficult to suppress optical blur in the overlap area. For example, since a plurality of projection images is superimposed on each other, individual blur of each projection image is also superimposed on each other in the overlap area. How the individual blur occurs in each projection image is irrespective of each other. In many cases, generally, how the individual blur occurs in each projection image constituting the overlap area is different from each other. Thus, a PSF needs to be estimated for each projection image in order to suppress the individual blur. However, since the method described in NPL 1 does not take the superimposition of the projection images into consideration, it is not possible to grasp a positional relationship between each of the projection images (how the projection images are superimposed on each other). Therefore, the method described in NPL 1 can only allow observation of the PSFs of the pixels of these projection images superimposed on each other. With the method described in NPL 1, therefore, it is not possible to correctly obtain the state of the individual blur of each projection image. As a result, there has been a risk that the individual blur cannot be sufficiently suppressed or another factor that deteriorates the image quality such as ringing or jaggies due to excessive correction is generated. Further, since it is not possible to grasp the positional relationship between each of the projection images with the method described in NPL 1, it has been also difficult, as a matter of course, to suppress the superimposition blur.

For example, a method of suppressing the superimposition blur and individual blur described in PTL 1 uses a feedback loop to adjust correction so as to minimize the difference between a superimposed image to be projected and an input image. However, it takes a long time for the correction to be converged since this method involves feedback loop processing. Therefore, it has been difficult to cope with the occurrence of deviation, for example. Further, there is also a possibility that the result does not converge to a true value. For example, there has been a risk that an attempt to suppress processing time increases the possibility of not converging to an optimal solution.

Therefore, it has been difficult to sufficiently suppress the optical blur in the overlap area even with a combination of the method described in PTL 1 and the method described in NPL 1. With these methods, as described above, there has been a risk that the subjective image quality of a projection image is reduced due to, for example, optical blur remaining in the projection image or generation of another factor that deteriorates the image quality.

<Suppression of Individual Blur and Superimposition Blur>

Accordingly, an inverse filter of a filter for transforming an input image to be projected by a plurality of projection sections into a projection image projected by the plurality of projection sections is generated on the basis of the individual-blur amount and the superimposition-blur amount. The individual-blur amount indicates the magnitude of optical blur generated in an individual projection image projected by each of the plurality of projection sections. The superimposition-blur amount indicates the magnitude of optical blur generated from superimposition of a plurality of the projection images. The input image is transformed using the generated inverse filter to generate a phase image.

2. First Embodiment

<Projection Imaging System>

FIG. 1 is a block diagram illustrating an example of a main configuration of an embodiment of a projection imaging system to which the present technology is applied. In FIG. 1, a projection imaging system 100 is a system capable of projecting an image, capturing a projection image, and performing image processing for suppressing optical blur using a method to which the present technology is applied.

As illustrated in FIG. 1, the projection imaging system 100 includes an image processing apparatus 111, a projection apparatus 112-1, a projection apparatus 112-2, and an imaging apparatus 113. The image processing apparatus 111 is communicably connected to each of the projection apparatus 112-1, the projection apparatus 112-2, and the imaging apparatus 113. This connection may be wired communication or wireless communication. That is, for example, the image processing apparatus 111, the projection apparatus 112-1, the projection apparatus 112-2, and the imaging apparatus 113 may be physically connected using a cable or the like, or may be physically separated from each other. It is noted that in a case where the projection apparatus 112-1 and the projection apparatus 112-2 do not need to be distinguished from each other in the description, the projection apparatus 112-1 and the projection apparatus 112-2 will be referred to as projection apparatuses 112.

The image processing apparatus 111 performs processing related to image processing on an input image input into the projection imaging system 100 and to be projected. For example, the image processing apparatus 111 performs image processing on input images to suppress optical blur generated in each of projection images, generates phase images for the respective projection apparatuses 112, and supplies each of the phase images to the projection apparatus 112 corresponding thereto.

Each projection apparatus 112 performs processing related to the projection of images. For example, each projection apparatus 112 projects an image supplied from the image processing apparatus 111 on a screen 120. For example, both the projection apparatus 112-1 and the projection apparatus 112-2 project respective images on a range 121 of the screen 120.

The imaging apparatus 113 performs processing related to imaging of a subject. For example, the imaging apparatus 113 captures an image of a range 122 of the screen 120. That is, the imaging apparatus 113 captures a projection image projected on the screen 120. It is noted that as illustrated in FIG. 1, the range 122 includes the entire range 121. That is, the imaging apparatus 113 captures an image of a range of the screen 120 including a range in which the entire overlap area between the projection images projected by the plurality of projection apparatuses 112 is projected. The imaging apparatus 113 supplies the captured image obtained by capturing the image to the image processing apparatus 111. The image processing apparatus 111 performs the above-described image processing on the basis of the captured image.

It is noted that the screen 120 is an example of an object on which the projection apparatuses 112 project images, and the object on which images are projected is not limited to the screen 120. That is, the projection apparatuses 112 can project images on any object and the imaging apparatus 113 can also capture projection images projected on the object.

<Configuration of Image Processing Apparatus>

Figure 2:
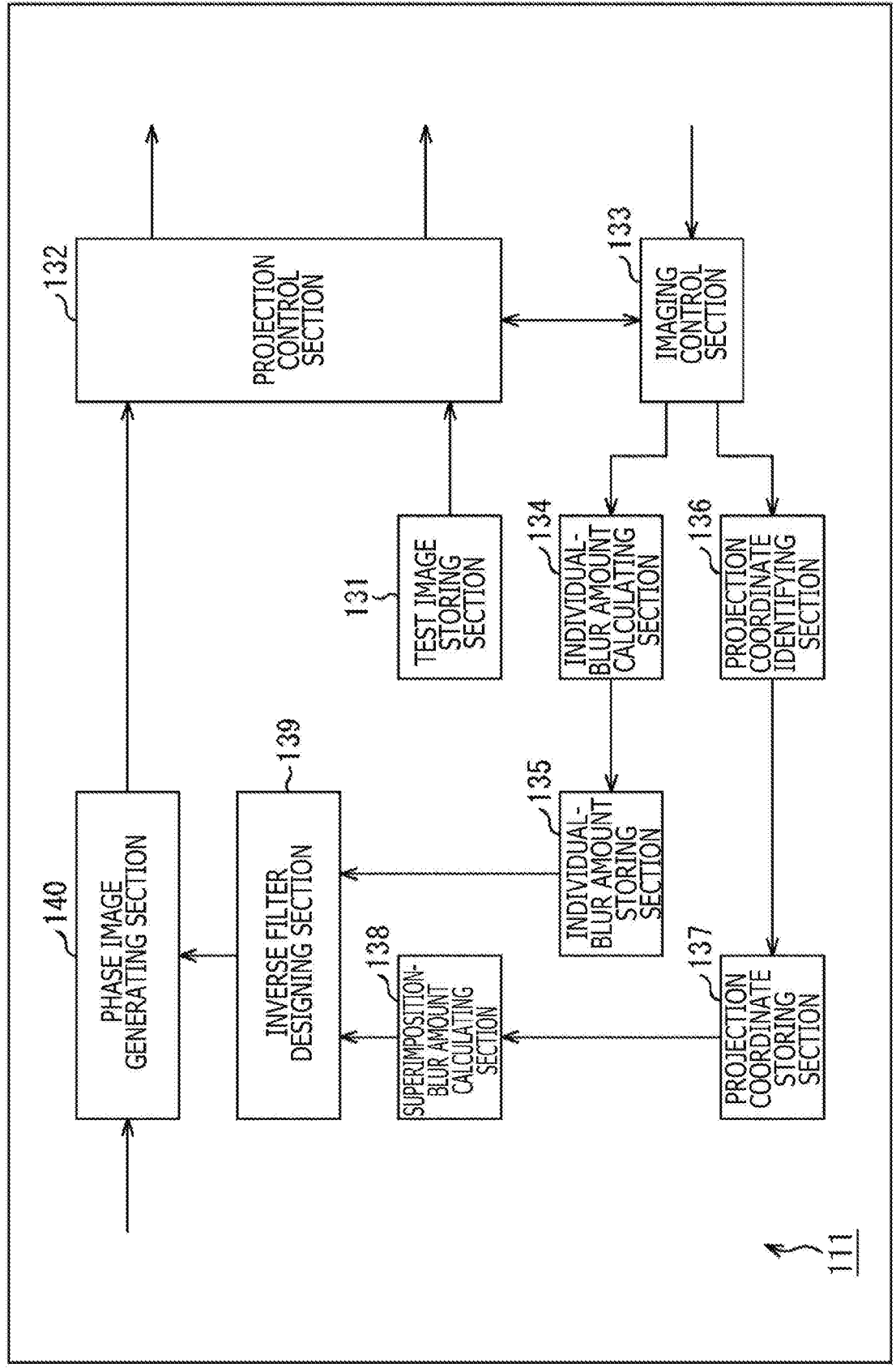
FIG. 2 is a block diagram illustrating an example of a main configuration of an image processing apparatus.

FIG. 2 is a block diagram illustrating an example of a main configuration of the image processing apparatus 111 in FIG. 1. As illustrated in FIG. 2, the image processing apparatus 111 includes a test image storing section 131, a projection control section 132, an imaging control section 133, an individual-blur amount calculating section 134, an individual-blur amount storing section 135, a projection coordinate identifying section 136, a projection coordinate storing section 137, a superimposition-blur amount calculating section 138, an inverse filter designing section 139, and a phase image generating section 140.

For example, the test image storing section 131 includes an arbitrary recording medium such as a hard disk or a semiconductor memory, and stores a test image in the recording medium. The test image is an image of a predetermined design used to suppress optical blur. The test image storing section 131 supplies the test image to the projection control section 132 at an arbitrary timing or on the basis of a request from the outside such as the projection control section 132, for example.

The projection control section 132 performs processing related to control of the projection apparatuses 112. For example, the projection control section 132 supplies the test image supplied from the test image storing section 131 and an input image and a phase image supplied from the phase image generating section 140 to the projection apparatus 112-1 and the projection apparatus 112-2. Further, the projection control section 132 controls the projection apparatus 112-1 and the projection apparatus 112-2, causing the projection apparatus 112-1 and the projection apparatus 112-2 to project the supplied images.

The imaging control section 133 performs processing related to control of the imaging apparatus 113. For example, the imaging control section 133 controls the imaging apparatus 113, causing the imaging apparatus 113 to capture an image of a subject (for example, the screen 120 on which an image is projected), and obtains the resulting captured image. Further, the imaging control section 133 supplies the captured image, which has been obtained, to the individual-blur amount calculating section 134 and the projection coordinate identifying section 136.

The individual-blur amount calculating section 134 performs processing related to calculation of the individual-blur amount indicating the magnitude of individual blur generated in an individual projection image projected by each projection apparatus 112. For example, the individual-blur amount calculating section 134 obtains, from the imaging control section 133, a captured image obtained by capturing a projection image projected by the projection apparatus 112-1 and calculates the individual-blur amount of the projection image projected by the projection apparatus 112-1 on the basis of the captured image. Similarly, the individual-blur amount calculating section 134 obtains, from the imaging control section 133, a captured image obtained by capturing a projection image projected by the projection apparatus 112-2 and calculates the individual-blur amount of the projection image projected by the projection apparatus 112-2 on the basis of the captured image. The individual-blur amount calculating section 134 supplies information indicating the calculated individual-blur amount to the individual-blur amount storing section 135.

For example, the individual-blur amount storing section 135 includes an arbitrary recording medium such as a hard disk or a semiconductor memory, and stores information indicating the individual-blur amount supplied from the individual-blur amount calculating section 134. Further, the individual-blur amount storing section 135 supplies the information indicating the stored individual-blur amount to the inverse filter designing section 139 at a predetermined timing or in response to a request from the outside such as the inverse filter designing section 139, for example.

The projection coordinate identifying section 136 performs processing related to identification of the position (also referred to as projection coordinates) of an individual projection image projected by each projection apparatus 112. For example, the projection coordinate identifying section 136 obtains, from the imaging control section 133, a captured image obtained by capturing a projection image projected by the projection apparatus 112-1, and identifies the projection coordinates of the projection image projected by the projection apparatus 112-1 on the basis of the captured image. Similarly, the projection coordinate identifying section 136 obtains, from the imaging control section 133, a captured image obtained by capturing a projection image projected by the projection apparatus 112-2, and identifies the projection coordinates of the projection image projected by the projection apparatus 112-2 on the basis of the captured image. The projection coordinate identifying section 136 supplies information indicating the identified projection coordinates to the projection coordinate storing section 137.

For example, the projection coordinate storing section 137 includes an arbitrary recording medium such as a hard disk or a semiconductor memory, and stores the information indicating the projection coordinates supplied from the projection coordinate identifying section 136. Further, the projection coordinate storing section 137 supplies the information indicating the stored projection coordinates to the superimposition-blur amount calculating section 138 at a predetermined timing or in response to a request from the outside such as the superimposition-blur amount calculating section 138, for example.

The superimposition-blur amount calculating section 138 performs processing related to calculation of the superimposition-blur amount indicating the magnitude of superimposition blur, which is optical blur generated from superimposition of a plurality of projection images. For example, the superimposition-blur amount calculating section 138 obtains the information indicating the projection coordinates from the projection coordinate storing section 137, and calculates the superimposition-blur amount on the basis of the information. Further, the superimposition-blur amount calculating section 138 supplies information indicating the calculated superimposition-blur amount to the inverse filter designing section 139.

The inverse filter designing section 139 performs processing related to generation of an inverse filter of a filter for transforming an individual input image to be projected by a corresponding one of the projection apparatuses 112 into a projection image projected on the screen 120 by the corresponding one of the projection apparatus 112. The inverse filter is such a filter that applying the inverse filter causes inverse transformation of transformation which is performed by applying a filter corresponding to the inverse filter. That is, applying the inverse filter can offset the influence of the filter. For example, the inverse filter designing section 139 obtains the information indicating the superimposition-blur amount from the superimposition-blur amount calculating section 138. Further, the inverse filter designing section 139 obtains the information indicating the individual-blur amount from the individual-blur amount storing section 135. On the basis of these pieces of information, the inverse filter designing section 139 designs and generates a filter for transforming an input image into a projection image, and designs and generates an inverse filter of the filter. The inverse filter designing section 139 generates the inverse filter for each projection apparatus 112. Further, the inverse filter designing section 139 supplies the generated inverse filter to the phase image generating section 140.

The phase image generating section 140 performs processing related to generation of a phase image. The phase image is an image obtained by applying the inverse filter, which has been generated by the inverse filter designing section 139, to an input image. That is, the phase image is an image in which the pixel value of the input image is corrected so as to reduce the difference between the input image and the projection image. For example, the phase image generating section 140 obtains the inverse filter from the inverse filter designing section 139 and transforms an input image using the inverse filter to generate a phase image. The phase image generating section 140 supplies the generated phase image to the projection control section 132, causing the corresponding projection apparatus 112 to project the phase image. As described above, the phase image is corrected so as to offset the difference between the input image and the projection image thereof (that is, a change from the input image to the projection image). Accordingly, the projection image of the phase image becomes closer to the input image. That is, causing the projection apparatus 112 to project the phase image instead of the input image in this manner can reduce the difference between the input image and the projection image. That is, individual blur and superimposition blur in the projection image can be suppressed. The phase image generating section 140 generates the phase image for each projection apparatus 112.

It is noted that the phase image generating section 140 can also supply the input image to the projection control section 132 without correcting the input image, causing the corresponding projection apparatus 112 to project the input image.

<Flow of Projection Processing>

The projection imaging system 100 executes projection processing to project an image. An example of a flow of the projection processing will be described with reference to a flowchart in FIG. 3.

When the projection processing starts, the image processing apparatus 111 performs blur amount calculation processing in step S101 to calculate the blur amount of optical blur generated in a projection image. In step S102, the phase image generating section 140 of the image processing apparatus 111 applies, to the input image, an inverse filter for the corresponding projection apparatus 112 that projects the input image to generate a phase image corresponding to the entire input image. In step S103, the projection apparatus 112 obtains and projects the phase image that has been generated in step S102 and that corresponds to the projection apparatus 112 itself.

For example, the phase image generating section 140 applies an inverse filter for the projection apparatus 112-1 to an input image to be projected by the projection apparatus 112-1 to transform the input image into a phase image, and supplies the phase image to the projection apparatus 112-1 via the projection control section 132. Further, the phase image generating section 140 applies an inverse filter for the projection apparatus 112-2 to an input image to be projected by the projection apparatus 112-2 to transform the input image into a phase image, and supplies the phase image to the projection apparatus 112-2 via the projection control section 132. Each projection apparatus 112 is controlled by the projection control section 132 and projects the phase image supplied thereto.

It is noted that the input images corresponding to the respective projection apparatuses 112 may be images of the same frame or images of different frames of a moving image input into the projection imaging system 100.

In step S104, the projection control section 132 determines whether or not to end the projection. In a case where it has been determined that an unprocessed input image exists and the projection does not end, the process returns to step S102 and the subsequent processes are repeated. That is, each process in steps S102 to S104 is executed on each input image. Then, in step S104, in a case where it has been determined that the projection ends after, for example, processing of all the input images, the projection processing ends.

<Flow of Blur Amount Calculation Processing>

Next, an example of a flow of the blur amount calculation processing executed in step S101 in FIG. 3 will be described with reference to a flowchart in FIG. 4.

When the blur amount calculation processing starts, the projection control section 132 selects the projection apparatus 112 to be processed (also referred to as a current projection apparatus) from the unprocessed projection apparatuses 112 in step S151. In step S152, the projection control section 132 reads the test image stored in the test image storing section 131, supplies the test image to the current projection apparatus 112, and controls the current projection apparatus 112 to cause the current projection apparatus 112 to project the supplied test image. The current projection apparatus 112 projects the supplied test image on the screen 120 according to the control.

Figure 5:
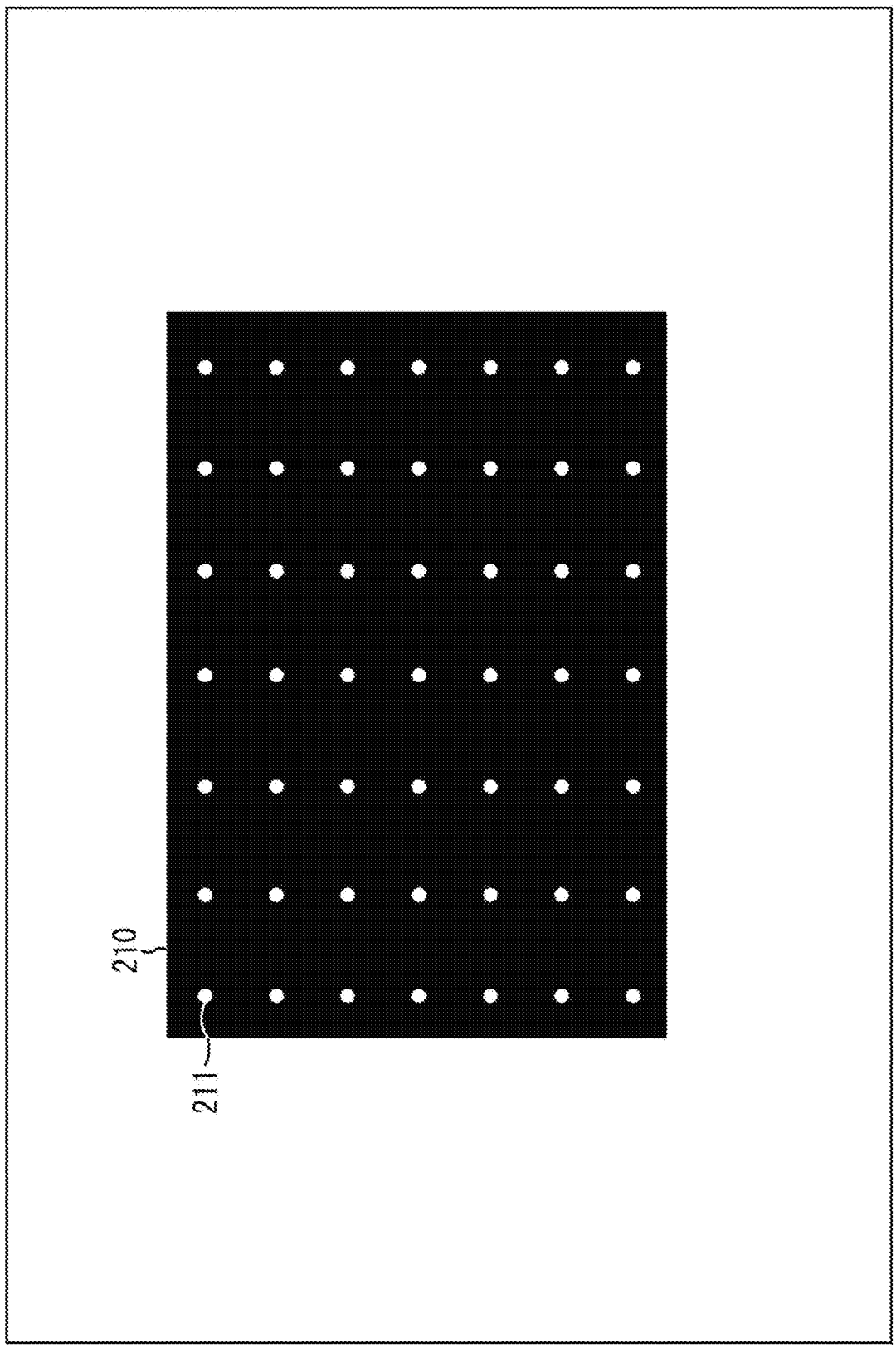
FIG. 5 is a diagram for describing an example of a test image.

FIG. 5 illustrates an example of the test image. In the case of the example in FIG. 5, a test image 210 includes dot patterns 211 drawn over the entire image at predetermined intervals. Needless to say, the contents of the test image (the design, brightness, color, pattern, and the like) may be any as long as it is possible to calculate the individual-blur amount, identify the projection coordinates, and the like.

In step S153, the imaging control section 133 controls the imaging apparatus 113, causing the imaging apparatus 113 to capture a projection image of the test image projected on the screen 120. The imaging apparatus 113 captures the projection image according to the control and supplies the captured image to the imaging control section 133. The imaging control section 133 supplies the supplied captured image to the individual-blur amount calculating section 134 and the projection coordinate identifying section 136.

Figure 6:
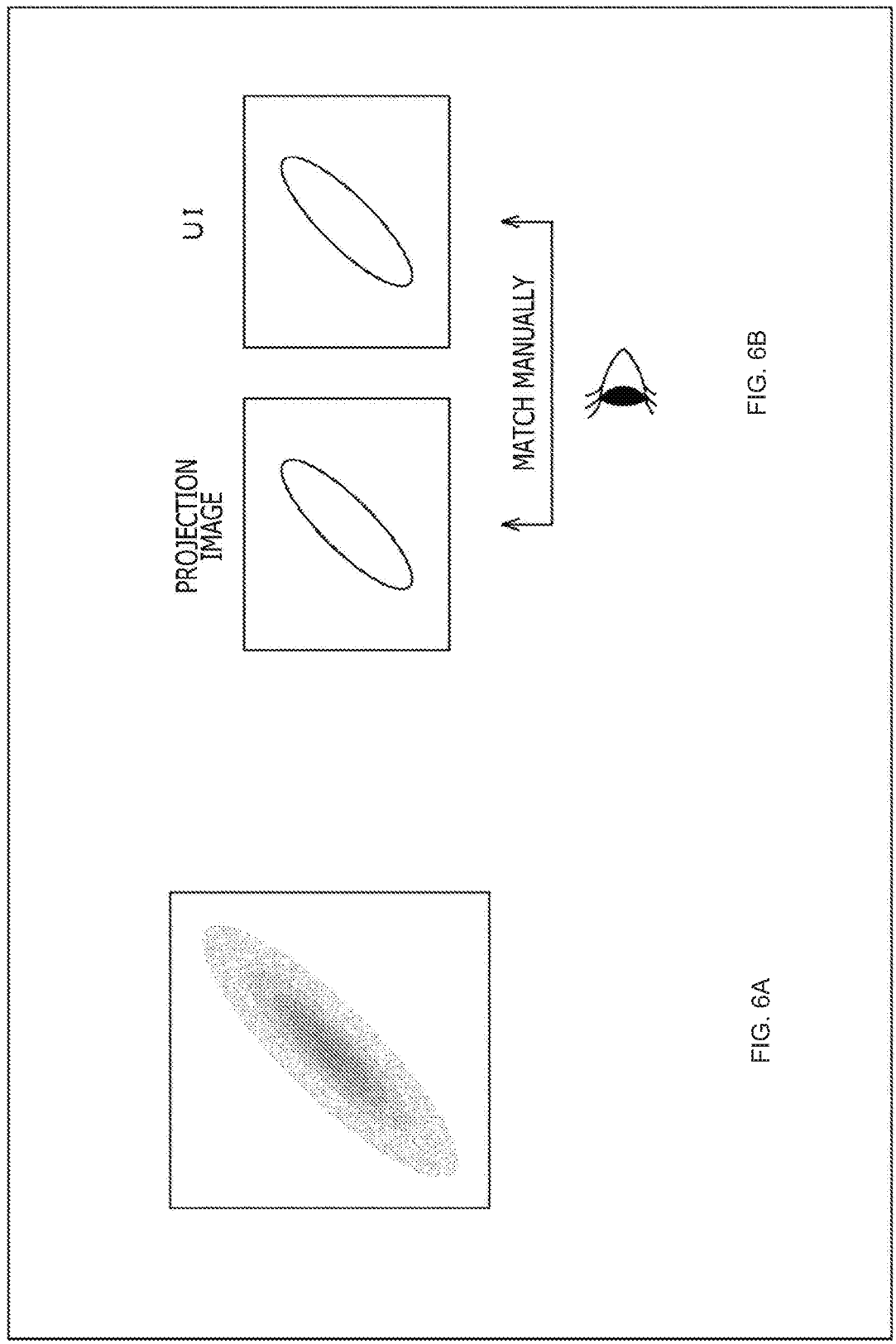
FIGS. 6A and 6B are diagrams for describing an example of how an individual-blur amount is calculated.

In step S154, the individual-blur amount calculating section 134 calculates the individual-blur amount $\omega_{individual\ blur}$ of the projection image of the test image included in the captured image on the basis of the supplied captured image. For example, as illustrated in FIG. 6A, when individual blur occurs in the projection image of the test image, the dot pattern 211 of the test image 210 in FIG. 5 diffuses (so-called blur). The individual-blur amount calculating section 134 calculates the individual-blur amount $\omega_{individual\ blur}$ on the basis of how the dot pattern 211 diffuses.

A method of calculating the individual-blur amount $\omega_{individual\ blur}$ is arbitrary. Further, the individual-blur amount $\omega_{individual\ blur}$ may be any parameter as long as the individual-blur amount $\omega_{individual\ blur}$ is a parameter indicating the magnitude of the individual blur. For example, the individual-blur amount calculating section 134 may extract the image (FIG. 6A) of the dot pattern 211 from the captured image and analyze the image to calculate a PSF (Point Spread Function) as the individual-blur amount $\omega_{individual\ blur}$. Further, for example, the individual-blur amount calculating section 134 may display a user interface (UI) on a monitor together with the captured image. The user interface can reproduce the spread of the dot pattern 211. While the user visually checks how the dot pattern 211 spreads on the captured image, the user may reproduce how the dot pattern 211 spreads by operating the user interface. The individual-blur amount calculating section 134 may receive the operation and set the parameter indicating how the reproduced dot pattern 211 spreads as the individual-blur amount $\omega_{individual\ blur}$.

The individual-blur amount calculating section 134 supplies information indicating the calculated individual-blur amount $\omega_{individual\ blur}$ to the individual-blur amount storing section 135, causing the individual-blur amount storing section 135 to store the information.

In step S155, the projection coordinate identifying section 136 identifies the projection coordinates of each pixel of the projection image of the test image included in the captured image (that is, the position (coordinates) at which each pixel is projected) on the basis of the supplied captured image.

Figure 7:
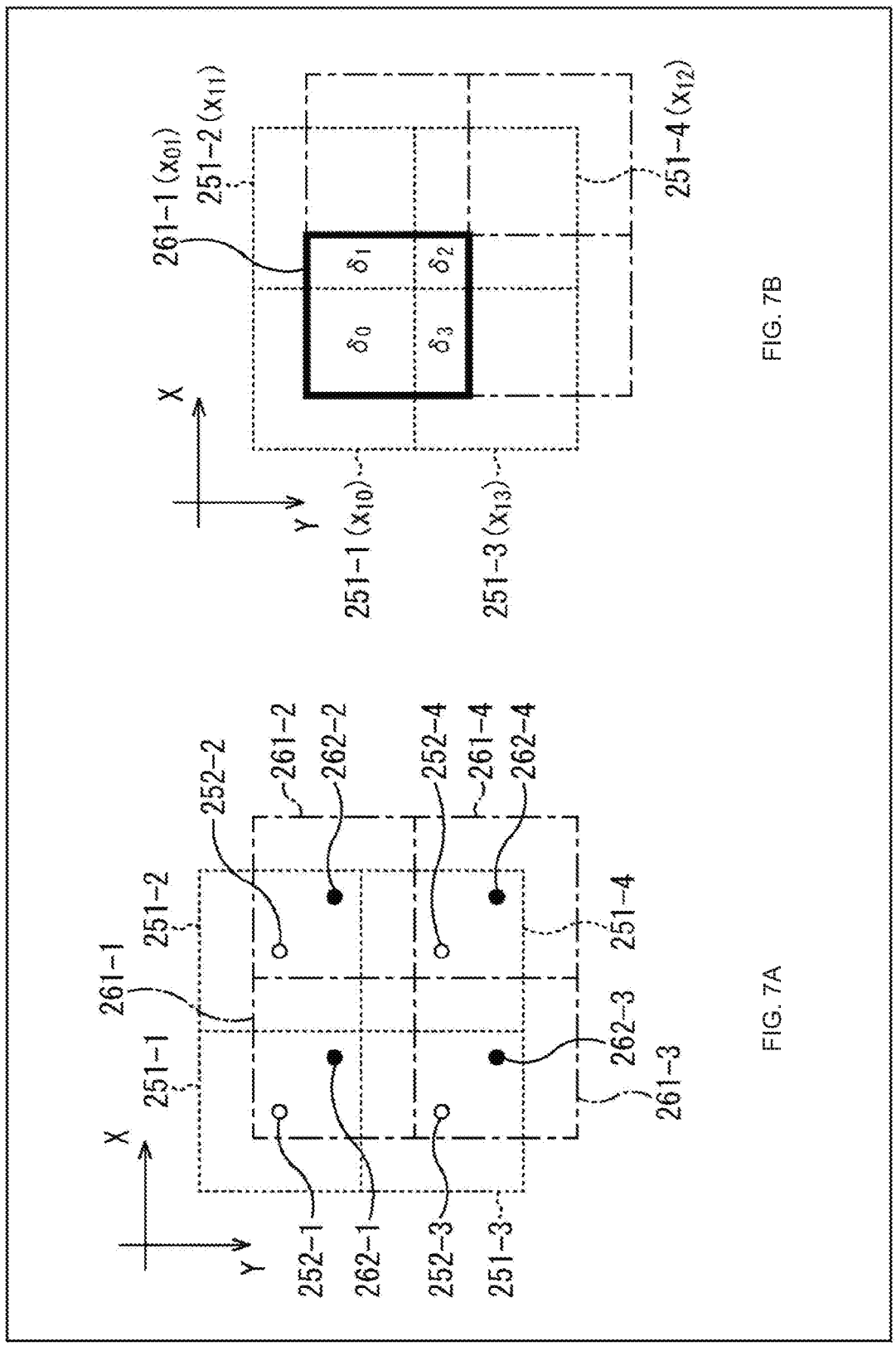
FIGS. 7A and 7B are diagrams for describing an example of how a superimposition-blur amount is calculated.

For example, the projection image projected by the projection apparatus 112-1 and the projection image projected by the projection apparatus 112-2 are assumed to be projected as illustrated in FIG. 7A. Each square indicated by a dotted line indicates a pixel aperture of the projection image projected by the projection apparatus 112-1, for example. The pixel aperture indicates a range in which light for one pixel is projected. That is, FIG. 7A illustrates a range (a pixel aperture 251-1, a pixel aperture 251-2, a pixel aperture 251-3, and a pixel aperture 251-4) in which light for four pixels (2×2 pixels) output from the projection apparatus 112-1 is projected. In a case where the pixel apertures 251-1 to 251-4 do not need to be distinguished from each other in the description, the pixel apertures 251-1 to 251-4 will be referred to as pixel apertures 251. By contrast, each square indicated by a dashed line in FIG. 7A indicates a pixel aperture of the projection image projected by the projection apparatus 112-2, for example. That is, FIG. 7A illustrates a range (a pixel aperture 261-1, a pixel aperture 261-2, a pixel aperture 261-3, and a pixel aperture 261-4) in which light for four pixels (2×2 pixels) output from the projection apparatus 112-2 is projected. In a case where the pixel apertures 261-1 to 261-4 do not need to be distinguished from each other in the description, the pixel apertures 261-1 to 261-4 will be referred to as pixel apertures 261.

It is noted that in FIG. 7A, a center of gravity 252-1 indicates the center of gravity of the pixel aperture 251-1, a center of gravity 252-2 indicates the center of gravity of the pixel aperture 251-2, a center of gravity 252-3 indicates the center of gravity of the pixel aperture 251-3, and a center of gravity 252-4 indicates the center of gravity of the pixel aperture 251-4. Similarly, a center of gravity 262-1 indicates the center of gravity of the pixel aperture 261-1, a center of gravity 262-2 indicates the center of gravity of the pixel aperture 261-2, a center of gravity 262-3 indicates the center of gravity of the pixel aperture 261-3, and a center of gravity 262-4 indicates the center of gravity of the pixel aperture 261-4. In a case where the centers of gravity 252-1 to 252-4 do not need to be distinguished from each other in the description, the centers of gravity 252-1 to 252-4 will be referred to as centers of gravity 252. Further, in a case where the centers of gravity 262-1 to 262-4 do not need to be distinguished from each other in the description, the centers of gravity 262-1 to 262-4 will be referred to as centers of gravity 262.

The projection coordinate identifying section 136 identifies such coordinates of the center of gravity of each pixel aperture as the projection coordinates of each pixel. The projection coordinate identifying section 136 supplies information indicating the identified projection coordinates of each of the pixels to the projection coordinate storing section 137, causing the projection coordinate storing section 137 to store the information.

In step S156, the projection control section 132 determines whether or not all the projection apparatuses 112 have been processed. In a case where it has been determined that there is any unprocessed projection apparatus 112, the process returns to step S151 and the new unprocessed projection apparatus 112 is selected as the current projection apparatus 112. Then, each process in steps S152 to S156 is executed on the new current projection apparatus 112. That is, each process in steps S151 to S156 is executed for each projection apparatus 112. Then, in a case where it has been determined in step S156 that all the projection apparatuses 112 have been processed, the process proceeds to step S157.

In step S157, the superimposition-blur amount calculating section 138 obtains information indicating the projection coordinates stored in the projection coordinate storing section 137 and calculates the superimposition-blur amount $\omega_{superimposition\ blur}$ from the projection coordinates. As described above, each process in steps S151 to S156 has been executed for each projection apparatus 112. Therefore, the projection coordinate storing section 137 stores the projection coordinates of each pixel of each of the projection images projected by all the projection apparatuses 112. That is, as illustrated in FIG. 7A, for example, the positional relationship (for example, the direction, distance, and the like) of the projection coordinates between the projection images superimposed on each other becomes clear from this information. Therefore, the superimposition-blur amount calculating section 138 calculates the superimposition-blur amount $\omega_{superimposition\ blur}$ on the basis of the positional relationship of the projection coordinates (the positional relationship of the centers of gravity of the pixel apertures).

A method of calculating the superimposition-blur amount $\omega_{superimposition\ blur}$ is arbitrary. Further, the superimposition-blur amount $\omega_{superimposition\ blur}$ may be any parameter as long as the superimposition-blur amount $\omega_{superimposition\ blur}$ is a parameter indicating the magnitude of the superimposition blur. For example, in the superimposition example in FIG. 7A, as illustrated in FIG. 7B, a pixel value z of the projection image in which the projection image projected by the projection apparatus 112-1 and the projection image projected by the projection apparatus 112-2 are superimposed on each other can be expressed as the following formula (1). The pixel value z of the projection image is at the position of the pixel aperture 261-1 (a pixel value x01).

It is noted that in the formula (1), $\delta_0$ indicates a ratio of a part in which the pixel aperture 261-1 and the pixel aperture 251-1 (a pixel value $x_{10}$) are superimposed on each other to the entire pixel aperture 261-1. $\delta_1$ indicates a ratio of a part in which the pixel aperture 261-1 and the pixel aperture 251-2 (a pixel value $x_{11}$) are superimposed on each other to the entire pixel aperture 261-1. $\delta_2$ indicates a ratio of a part in which the pixel aperture 261-1 and the pixel aperture 251-4 (a pixel value $x_{12}$) are superimposed on each other to the entire pixel aperture 261-1. $\delta_3$ indicates a ratio of a part in which the pixel aperture 261-1 and the pixel aperture 251-3 (a pixel $x_{13}$) are superimposed on each other to the entire pixel aperture 261-1.

$$z=(\delta_0+\delta_1+\delta_2+\delta_3)x_{01}+\delta_0 x_{10}+\delta_1 x_{11}+\delta_2 x_{12}+\delta_3 x_{13} \qquad (1)$$

$\delta_0$ to $\delta_3$ can be obtained on the basis of the projection coordinates of both the projection images superimposed on each other. The pixel value (pixel value not including the individual blur) of each projection image can be obtained from the corresponding input image. Therefore, the pixel value z (pixel value including only the superimposition blur) of the superimposed projection image can be obtained using the model formula as indicated in the formula (1). For example, the magnitude of the error between this pixel value z and the pixel value of the corresponding input image may be set as the superimposition-blur amount $\omega_{superimposition\ blur}$.

The superimposition-blur amount calculating section 138 supplies information indicating the calculated superimposition-blur amount $\omega_{superimposition\ blur}$ to the inverse filter designing section 139.

In step S158, the inverse filter designing section 139 obtains the information indicating the superimposition-blur amount $\omega_{superimposition\ blur}$ from the superimposition-blur amount calculating section 138. Further, the inverse filter designing section 139 obtains the information indicating the individual-blur amount $\omega_{individual\ blur}$ stored in the individual-blur amount storing section 135. As described above, since each process in steps S151 to S156 has been executed for each projection apparatus 112, the individual-blur amount storing section 135 stores the information indicating the individual-blur amount $\omega_{individual\ blur}$ of each of the projection images projected by all the projection apparatuses 112.

As indicated in the following formula (2), therefore, the inverse filter designing section 139 convolutes the individual-blur amount $\omega_{individual\ blur}$ of each projection image to be superimposed on the superimposition-blur amount $\omega_{superimposition\ blur}$ to obtain the blur amount (final blur amount $\omega_{final\ blur}$) of the superimposed projection image.

$$\omega_{final\ blur}=\omega_{individual\ blur}*\omega_{superimposition\ blur} \qquad (2)$$

The inverse filter designing section 139 obtains the final blur amount $\omega_{final\ blur}$ for all the pixels in a part in which projection images are superimposed on each other and uses the resulting value to design a filter for transforming an input image into a superimposed projection image. That is, the inverse filter designing section 139 generates a filter for each projection apparatus 112.

Figure 8:
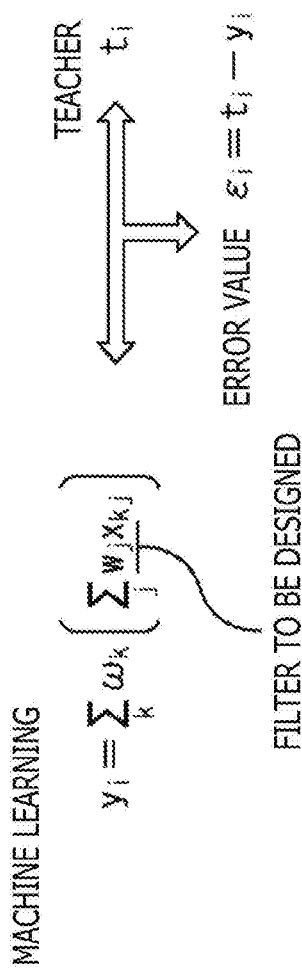
FIGS. 8A and 8B are diagrams for describing an example of how an inverse filter is designed.

A method of designing (generating) this filter is arbitrary. For example, as illustrated in FIG. 8A, the filter may be designed such that the error between a value obtained by filtering the input image and the projection image of the input image is minimized. For example, a coefficient for one pixel of the filter is assumed to be w¬¬j. A pixel value $y_i$ of the projection image may be expressed using a blur amount $\omega_k$, the coefficient $w_j$, and a pixel value $x_{kj}$ of the input image, as indicated in the following formula (3). Machine learning may be used to obtain the coefficient wj such that an error εi (formula (4)) between the pixel value yi and a teacher ti is minimized. The teacher ti is a pixel value of the projection image in which the projection images projected by the respective projection apparatuses 112 are superimposed on each other.

$$y_i = \sum_k \omega_k \left( \sum_j w_j x_{kj} \right) \qquad (3)$$

$$\varepsilon_i = t_i - y_i \qquad (4)$$

Further, for example, the filter may be designed such that the mean square error of the pixel values of the input image and the projection image is minimized.

After designing the filter as described above, the inverse filter designing section 139 designs and generates the inverse filter of each filter. That is, the inverse filter designing section 139 generates the inverse filter for each projection apparatus 112. A method of designing (generating) this inverse filter is arbitrary. For example, as illustrated in FIG. 8B, a Wiener filter may be used. After generating the inverse filter as described above, the inverse filter designing section 139 supplies the inverse filter to the phase image generating section 140.

Figure 3:
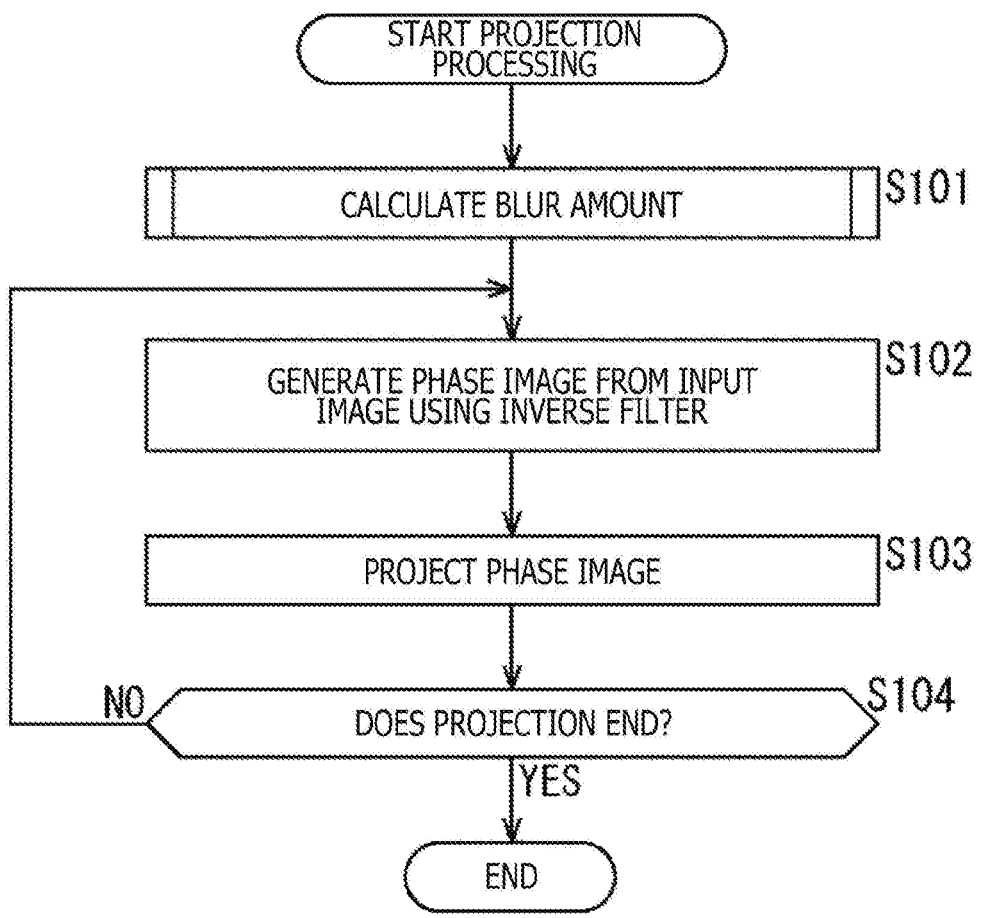
FIG. 3 is a flowchart for describing an example of a flow of projection processing.
Figure 4:
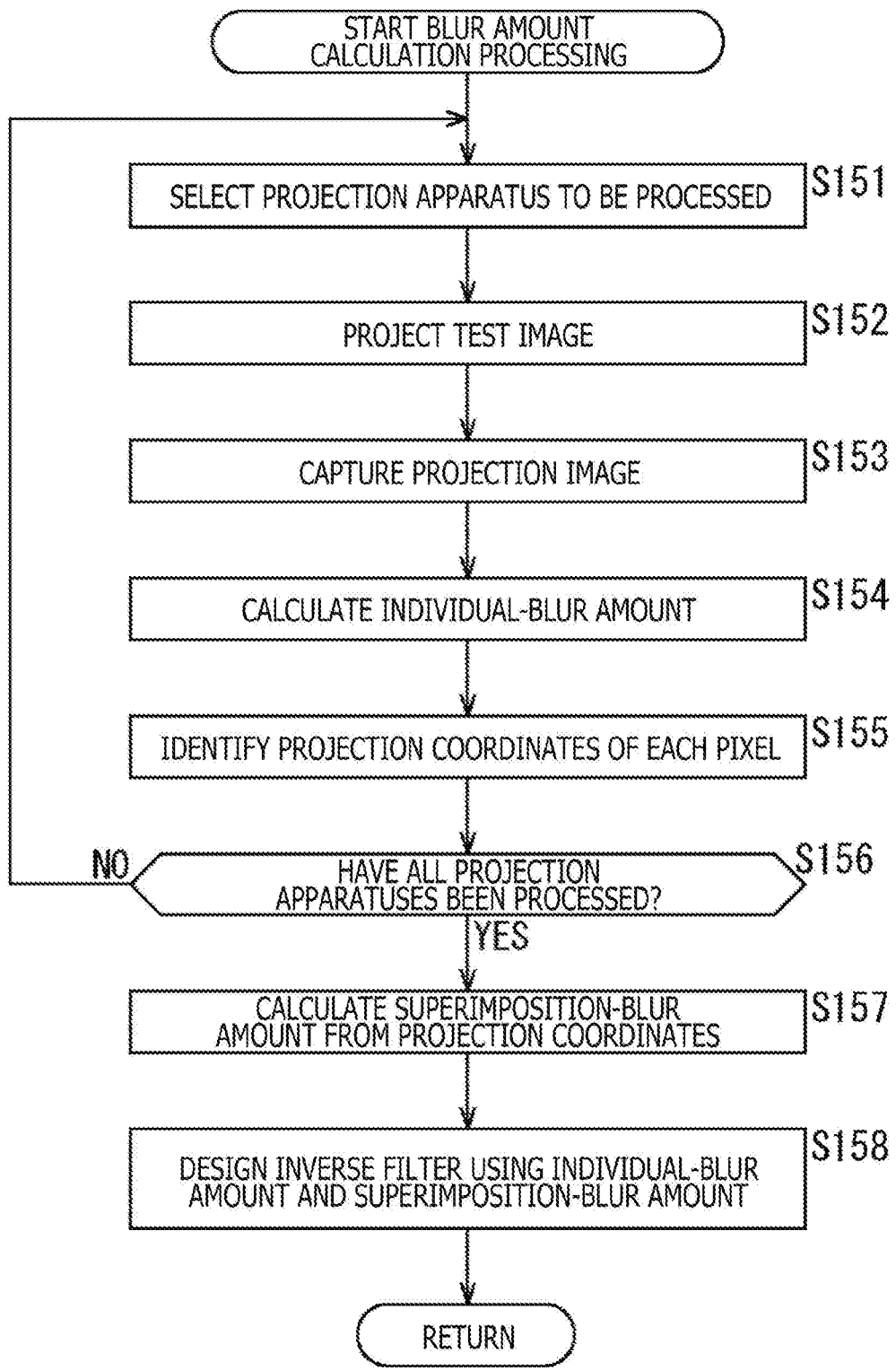
FIG. 4 is a flowchart for describing an example of a flow of blur amount calculation processing.

When the process in step S158 ends, the blur amount calculation processing ends and the process returns to FIG. 3.

Executing each process as described above allows more accurate obtainment of the blur amount, thereby allowing more accurate suppression of the individual blur and the superimposition blur in a projection image in which a plurality of projection images is superimposed on each other. That is, a reduction in the subjective image quality of the projection image can be suppressed. Further, the blur amount can be calculated at a higher speed by calculating the blur amount as described above.

It is noted that while, in the above description, the coefficient w for one pixel is obtained to design the filter, the number of coefficients w is arbitrary and may be one or more than one. For example, an arbitrary number of representative pixels may be set and the coefficient w may be calculated for each representative pixel. The representative pixel may be set for the entire image or may be set for each partial area of the image. Further, the coefficient w may be calculated for each of all the pixels of the image. For example, each coefficient w may be calculated using linear programming or the like.

3. Second Embodiment

<Partially Superimposing Projection Images>

It is noted that the projection positions of the individual projection images projected by the respective projection apparatuses 112 may be different from each other. That is, the overlap area in which the plurality of projection images is superimposed on each other may not be the entire projection image, as in the example in FIG. 1. For example, partial areas of the projection images may be superimposed on each other, as illustrated in the example in FIG. 9.

Figure 9:
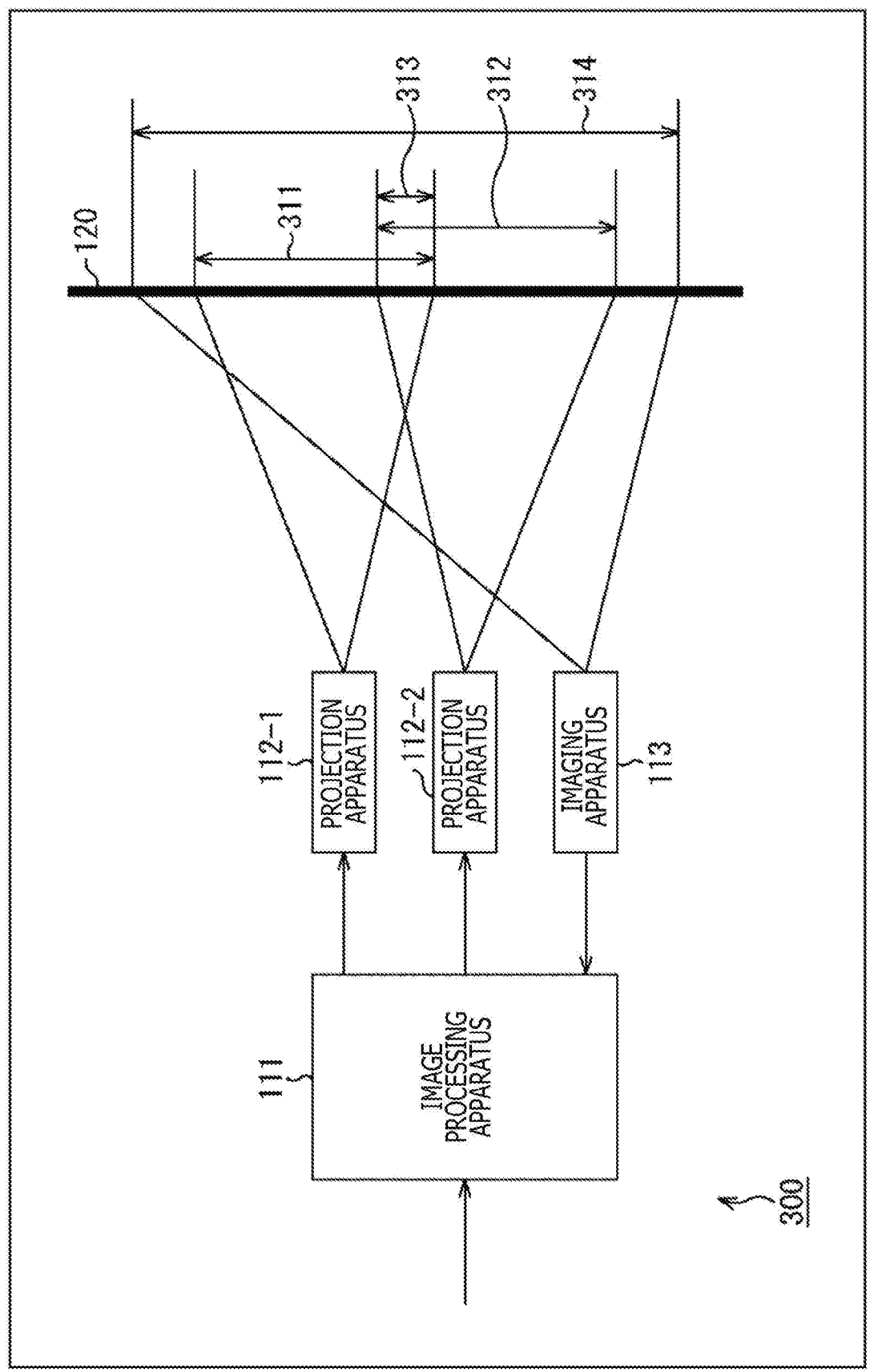
FIG. 9 is a block diagram illustrating an example of a main configuration of a projection imaging system.

A projection imaging system 300 illustrated in FIG. 9 is a system that has a similar configuration to the projection imaging system 100 in FIG. 1 and performs similar processing. In the case of the projection imaging system 300, however, the overlap area between the projection image projected by the projection apparatus 112-1 and the projection image projected by the projection apparatus 112-2 is a part of the projection images.

As illustrated in FIG. 9, the projection image projected by the projection apparatus 112-1 is projected on a range 311 of the screen 120. By contrast, the projection image projected by the projection apparatus 112-2 is projected on a range 312 of the screen 120. Therefore, the overlap area is a range 313, which is a part in which the range 311 and the range 312 are superimposed on each other. That is, only the partial areas of the projection images projected by these projection apparatuses 112 are superimposed on each other. This configuration can further increase the image size while suppressing a reduction in the image quality of the projection image, for example.

It is sufficient if the imaging apparatus 113 captures an image of the entire overlap area. Therefore, the imaging apparatus 113 may capture an image of a range 314 including the range 311 and the range 312, as in the example in FIG. 9.

The present technology can also be applied to this projection imaging system 300. That is, the projection imaging system 300 can also more accurately suppress the individual blur and the superimposition blur in the overlap area, as in the case described in the first embodiment. That is, a reduction in the subjective image quality of the projection image can be suppressed. Further, the blur amount can be calculated at a higher speed by calculating the blur amount as described above.

It is noted that in this case, the phase image generating section 140 generates a phase image for the overlap area between the projection images. That is, in the description in the first embodiment, the phase image generating section 140 generates a phase image for the entire input image. However, the phase image generating section 140, in this case, transforms a part of an input image using an inverse filter generated by the inverse filter generating section 139 to generate a phase image for the part of the input image.

At this time, the phase image generating section 140 may omit the generation of the phase image for an area other than the overlap area between the projection images. That is, the input image may be projected for the area other than the overlap area between the projection images. Further, the phase image generating section 140 may perform image processing so as to suppress only individual blur in the area other than the overlap area between the projection images.

This configuration can reduce the processing amount of the image processing, thereby suppressing an increase in load and cost. Further, for example, the inverse filter designing section 139 may design a filter for this area using only the individual-blur amount to generate an inverse filter thereof and the phase image generating section 140 may use the inverse filter to generate a phase image of the area other than the overlap area between the projection images. This configuration can also suppress a reduction in the subjective image quality of the area other than the overlap area.

4. Third Embodiment

It is noted that the projection positions of respective pixels of an individual projection image projected by each projection apparatus 112 may be shifted from each other. For example, shifting the projection position of each projection image by half a pixel can increase the resolution of the projection image in which a plurality of projection images is superimposed on each other. In this manner, the present technology can also be applied to a case where the projection coordinates of each pixel of the overlap area do not match each other between the projection images in a state where each projection image is projected at a correct position.

Figure 10:
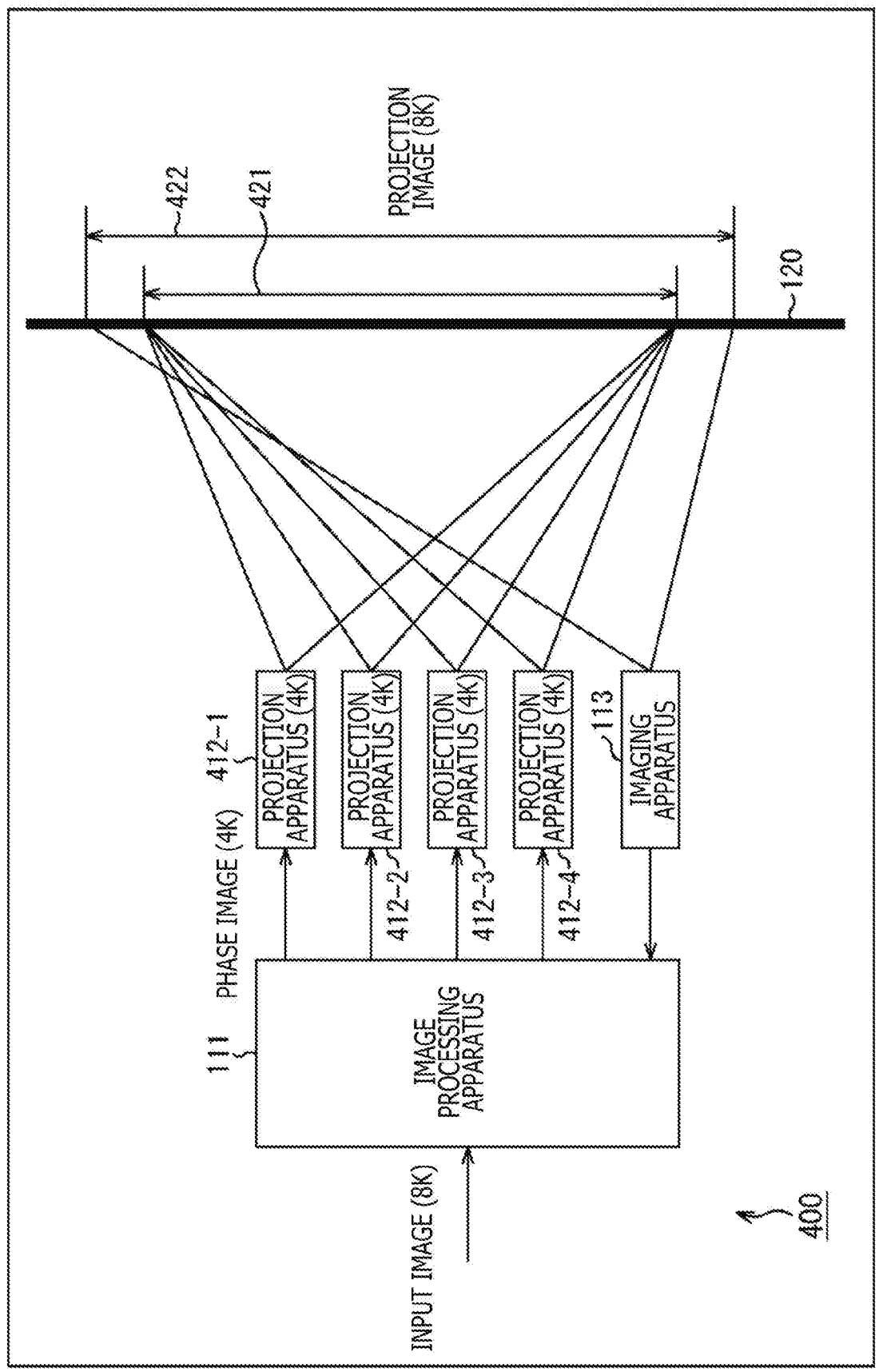
FIG. 10 is a block diagram illustrating an example of a main configuration of a projection imaging system.

For example, a projection imaging system 400 illustrated in FIG. 10 is a system similar to the projection imaging system 100, but includes the image processing apparatus 111, projection apparatuses 412-1 to 412-4, and the imaging apparatus 113. In a case where the projection apparatuses 412-1 to 412-4 do not need to be distinguished from each other in the following description, the projection apparatuses 412-1 to 412-4 will be referred to as projection apparatuses 412. The resolution of an input image input into the image processing apparatus 111 is so-called 8K (7680 pixels×4320 pixels). The projection apparatuses 412 are apparatuses that have a similar configuration to the projection apparatuses 112 and perform similar processing. The projection apparatuses 412 can project an image with so-called 4K (3840 pixels×2160 pixels) resolution. Therefore, the image processing apparatus 111 generates a phase image with 4K resolution from an input image with 8K resolution and supplies the phase image to the corresponding projection apparatus 412.

Each of the four projection apparatuses 412 projects an image with 4K resolution on a range 421 of the screen 120. At this time, each projection apparatus 412 projects the image on the screen 120 at a corresponding one of the positions each shifted by half a pixel in the vertical direction or the horizontal direction. As a result, a projection image with 8K resolution is projected at the position of the range 421 of the screen 120.

It is sufficient if the imaging apparatus 113 captures an image of the entire overlap area. Therefore, the imaging apparatus 113 captures an image of a range 422 including the range 421.

By projecting images in this manner, the projection imaging system 400 can project an image with 8K resolution without substantially changing the image size using the projection apparatuses 412 that project images with 4K resolution. That is, the projection imaging system 400 can perform image projection of an input image without reducing the resolution of a projection image, using the plurality of projection apparatuses that each projects an image with resolution lower than the resolution of the input image. By using the plurality of projection apparatuses, in other words, the projection imaging system 400 can perform image projection such that the resolution of the projection image becomes higher than the resolution with which the projection apparatuses can project images. That is, since the projection apparatuses with lower performance can be used, an increase in cost can be suppressed (cost is reduced while an increase in power consumption can be suppressed).

The present technology can also be applied to this projection imaging system 400. That is, the projection imaging system 400 can also more accurately suppress the individual blur and the superimposition blur in the overlap area, as in the case described in the first embodiment. That is, a reduction in the subjective image quality of the projection image can be suppressed. Further, the blur amount can be calculated at a higher speed by calculating the blur amount as described above.

5. Fourth Embodiment

<Other Configurations>

It is noted that the configuration of the projection imaging system 100 to which the present technology is applied is not limited to the above-described examples in FIGS. 1, 9, and 10. For example, each of the number of image processing apparatuses 111, the number of projection apparatuses 112, and the number of imaging apparatuses 113 is arbitrary and may be more than one. Further, the specifications (for example, the resolution, brightness, frame rate, and the like) of the respective projection apparatuses 112 may or may not be all the same.

Figure 11:
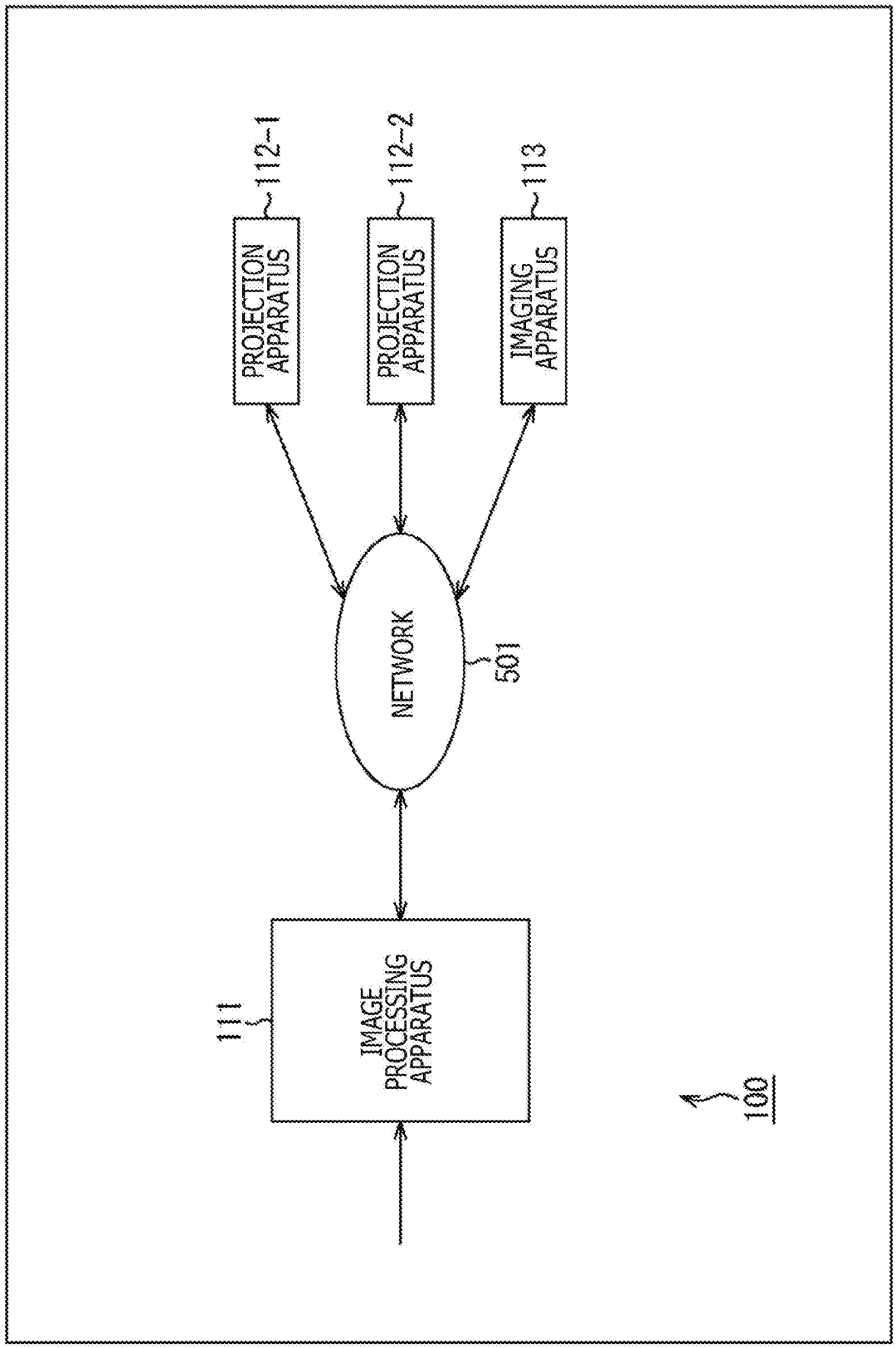
FIG. 11 is a block diagram illustrating an example of a main configuration of a projection imaging system.

Further, for example, as illustrated in FIG. 11, each apparatus of the projection imaging system 100 may be connected to each other via a network 501.

This network 501 is an arbitrary communication network. A communication method employed by the network 501 is arbitrary and may be wired communication, wireless communication, or both thereof, for example. Further, the network 501 may include a single communication network or may include a plurality of communication networks. For example, the network 501 may include communication networks and/or communication paths conforming to arbitrary communication standards such as: the Internet; a public switched telephone network; a wide area communication network for wireless mobile terminals such as a so-called 3G network or 4G network; a WAN (Wide Area Network); a LAN (Local Area Network); a wireless communication network for performing communication conforming to the Bluetooth (registered trademark) standard; a communication path for near field communication such as near field communication (NFC); a communication path for infrared communication; and a communication network of wired communication conforming to the standard such as a HDMI (High-Definition Multimedia Interface) (registered trademark) or a USB (Universal Serial Bus).

Each apparatus is communicably connected to the network 501. It is noted that this connection may be wired (that is, connection via wired communication), wireless (that is, connection via wireless communication), or both thereof. Each apparatus can communicate (transmit and receive information and the like) with each other via the network 501. In other words, each apparatus may be connected to each other via another equipment (an apparatus, a transmission path, or the like) so as to be communicable with each other. With such a configuration as well, the present technology can be applied to the projection imaging system 100 as in the case of the other embodiments described above, and the projection imaging system 100 can provide the functional effects described above.

Figure 12:
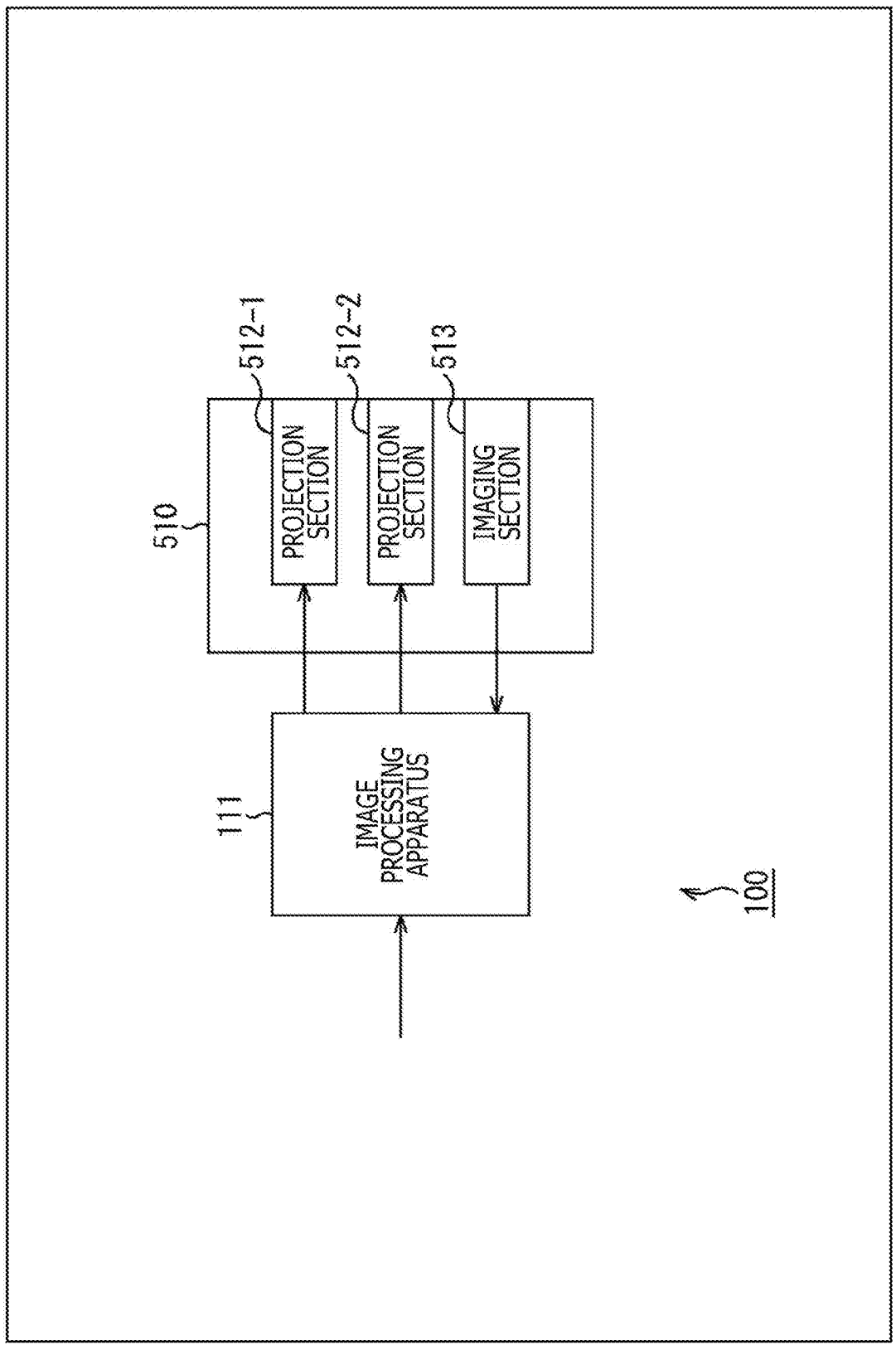
FIG. 12 is a block diagram illustrating an example of a main configuration of a projection imaging system.

Further, for example, as illustrated in FIG. 12, the projection apparatus 112 and the imaging apparatus 113 may be integrated to be configured as one apparatus. In the case of the example in FIG. 12, the projection imaging system 100 includes a projection imaging apparatus 510 instead of the projection apparatuses 112 and the imaging apparatus 113. The projection imaging apparatus 510 is an apparatus that performs processing related to projecting and capturing of an image and includes a projection section 512-1, a projection section 512-2, and an imaging section 513. The projection section 512-1 and the projection section 512-2 are processing sections that perform processing related to image projection. Each of the projection section 512-1 and the projection section 512-2 has a similar configuration to the projection apparatuses 112 and performs similar processing. It is noted that in a case where the projection section 512-1 and the projection section 512-2 do not need to be distinguished from each other in the description, the projection section 512-1 and the projection section 512-2 will be referred to as projection sections 512. The imaging section 513 is a processing section that performs processing related to capturing of an image. The imaging section 513 has a similar configuration to the imaging apparatus 113 and performs similar processing. As illustrated in FIG. 12, this projection imaging apparatus 510 is also connected to the image processing apparatus 111. On the basis of a captured image captured by the imaging section 513, the image processing apparatus 111 transforms an input image to generate a phase image so as to reduce the individual blur and the superimposition blur in a projection image. Each projection section 512 projects the phase image. Therefore, with this configuration as well, the present technology can be applied to the projection imaging system 100 and the projection imaging system 100 can provide the functional effects described above.

It is noted that only the projection apparatuses 112 may be integrated as one apparatus while the imaging apparatus 113 may be an apparatus provided separately therefrom. Further, only some of the projection apparatuses 112 may be integrated while the other projection apparatus 112 and the imaging apparatus 113 may be an apparatus provided separately therefrom.

Figure 13:
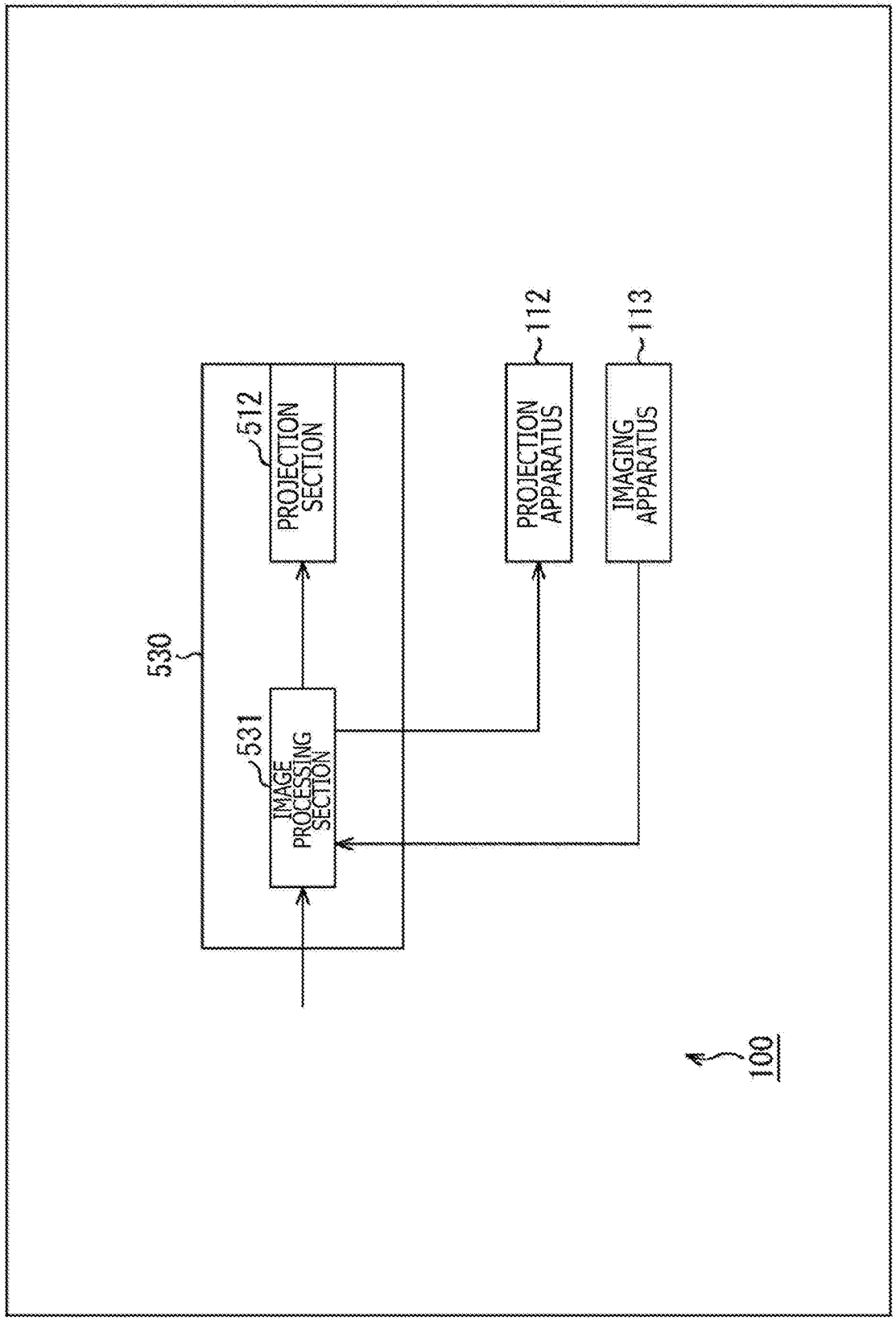
FIG. 13 is a block diagram illustrating an example of a main configuration of a projection imaging system.

Further, the image processing apparatus may also be integrated. For example, as illustrated in FIG. 13, the image processing apparatus 111 and the projection apparatus 112 may be integrated to be configured as one apparatus. In the case of the example in FIG. 13, the projection imaging system 100 includes a projection apparatus 530 instead of the image processing apparatus 111 and the projection apparatus 112-1. The projection apparatus 530 includes an image processing section 531 and the projection section 512. The image processing section 531 is a processing section that performs processing related to image processing on an input image. The image processing section 531 has a similar configuration to the image processing apparatus 111 and performs similar processing. As illustrated in FIG. 13, the projection apparatus 112 and the imaging apparatus 113 are connected to the image processing section 531 similarly to the case where the projection apparatus 112 and the imaging apparatus 113 are connected to the image processing apparatus 111. On the basis of a captured image captured by the imaging apparatus 113, the image processing section 531 transforms an input image to generate a phase image so as to reduce the individual blur and the superimposition blur in a projection image. Each of the projection section 512 and the projection apparatus 112 projects the corresponding phase image. Therefore, with this configuration as well, the present technology can be applied to the projection imaging system 100 and the projection imaging system 100 can provide the functional effects described above.

It is noted that the image processing apparatus 111 and the plurality of projection apparatuses 112 may be integrated as one apparatus. Further, the image processing apparatus 111 and all the projection apparatuses 112 may be integrated as one apparatus. Further, the image processing apparatus 111 and the imaging apparatus 113 may be integrated as one apparatus.

Figure 14:
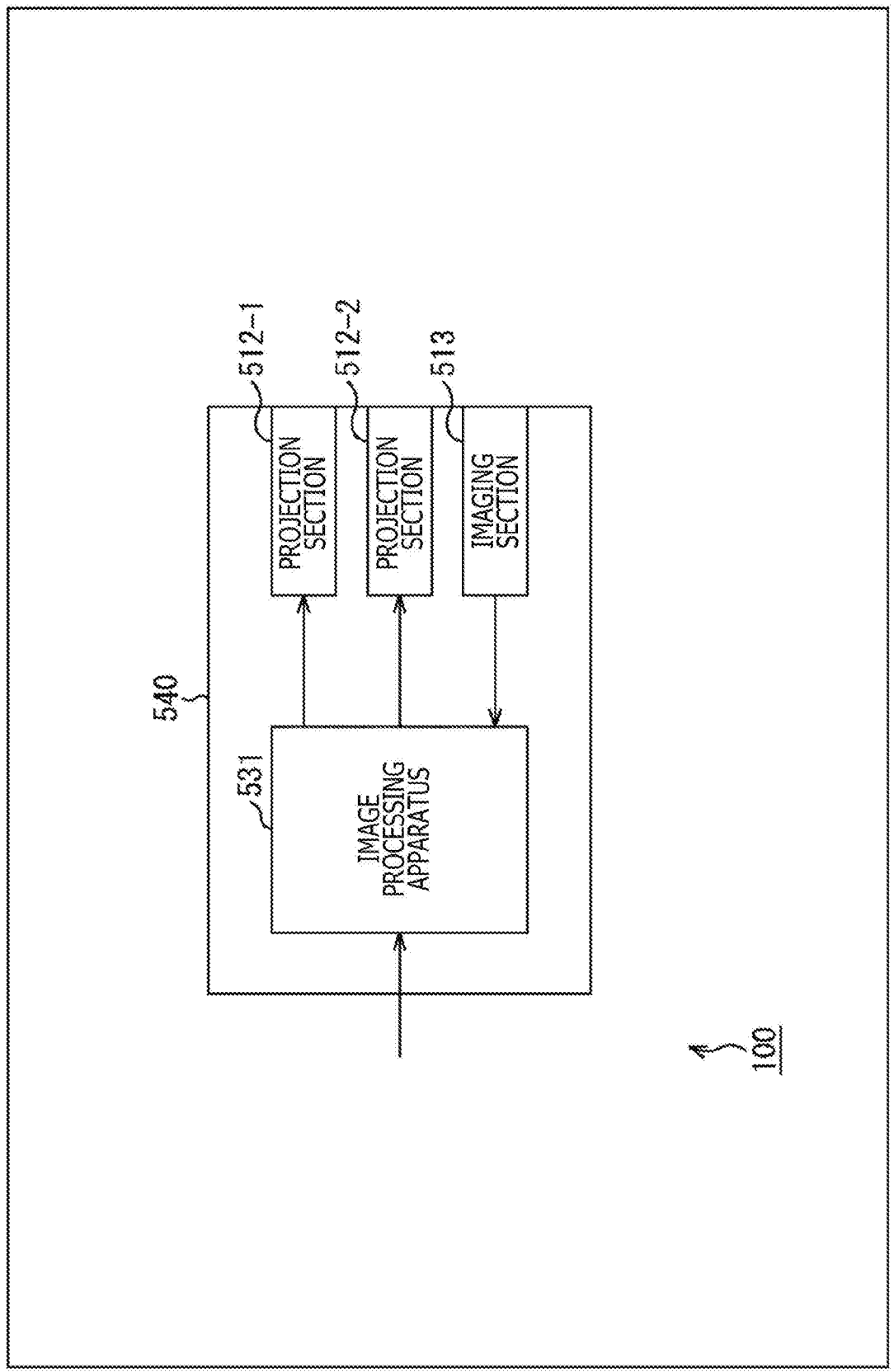
FIG. 14 is a block diagram illustrating an example of a main configuration of a projection imaging system.

In addition, as illustrated in FIG. 14, for example, all the apparatuses of the projection imaging system 100 may be integrated. In the case of the example in FIG. 14, the projection imaging system 100 includes a projection imaging apparatus 540, instead of the image processing apparatus 111, the projection apparatuses 112, and the imaging apparatus 113. The projection imaging apparatus 540 includes the image processing section 531, the projection section 512-1, the projection section 512-2, and the imaging section 513. On the basis of a captured image captured by the imaging section 513, the image processing section 531 transforms an input image to generate a phase image so as to reduce the individual blur and the superimposition blur in a projection image. Each projection section 512 projects the corresponding phase image. Therefore, with this configuration as well, the present technology can be applied to the projection imaging system 100 and the projection imaging system 100 can provide the functional effects described above.

Needless to say, each apparatus of the projection imaging system 100 is not limited to the above-described example and can be integrated as one apparatus in any combination. It is noted that the projection imaging system 300 and the projection imaging system 400 can also have any configuration, as in the case of the projection imaging system 100 described above.

Further, although the present technology has been described above using the projection imaging system, the present technology can be applied to any configuration having an image display function such as an image display apparatus or an image display system, or any configuration that performs processing for displaying images.

6. Others

<Fields of Application of Present Technology>

The present technology can be applied to systems, apparatuses, processing sections, and the like that are used in arbitrary fields such as, for example, traffic, medical care, crime prevention, agriculture, livestock industry, mining industry, beauty, factories, home electronics, meteorology, and natural surveillance, as long as the systems, apparatuses, processing sections, and the like are used for image processing.

For example, the present technology can also be applied to systems and devices used for viewing. Further, for example, the present technology can also be applied to systems and devices used for traffic management. In addition, for example, the present technology can also be applied to systems and devices used for security. Further, for example, the present technology can also be applied to systems and devices used for sports. In addition, for example, the present technology can also be applied to systems and devices used for agriculture. Further, for example, the present technology can also be applied to systems and devices used for the livestock industry. In addition, for example, the present technology can also be applied to systems and devices for monitoring the state of nature such as volcanoes, forests, and oceans. Further, for example, the present technology can be applied to meteorological observation systems and meteorological observation apparatuses for observing weather, temperature, humidity, wind speed, daylight hours, and the like. In addition, for example, the present technology can also be applied to systems, devices, and the like for observing the ecology of wildlife such as birds, fish, reptiles, amphibians, mammals, insects, and plants.

<Software>

The series of processes described above can be executed by hardware or software. Further, a part of the processes can be executed by hardware while the other processes can be executed by software. In a case where the series of processes is executed by software, a program constituting the software is installed in a computer. Here, examples of the computer include a computer incorporated into dedicated hardware and a general-purpose personal computer, for example, capable of executing various kinds of functions with various kinds of programs installed therein.

Figure 15:
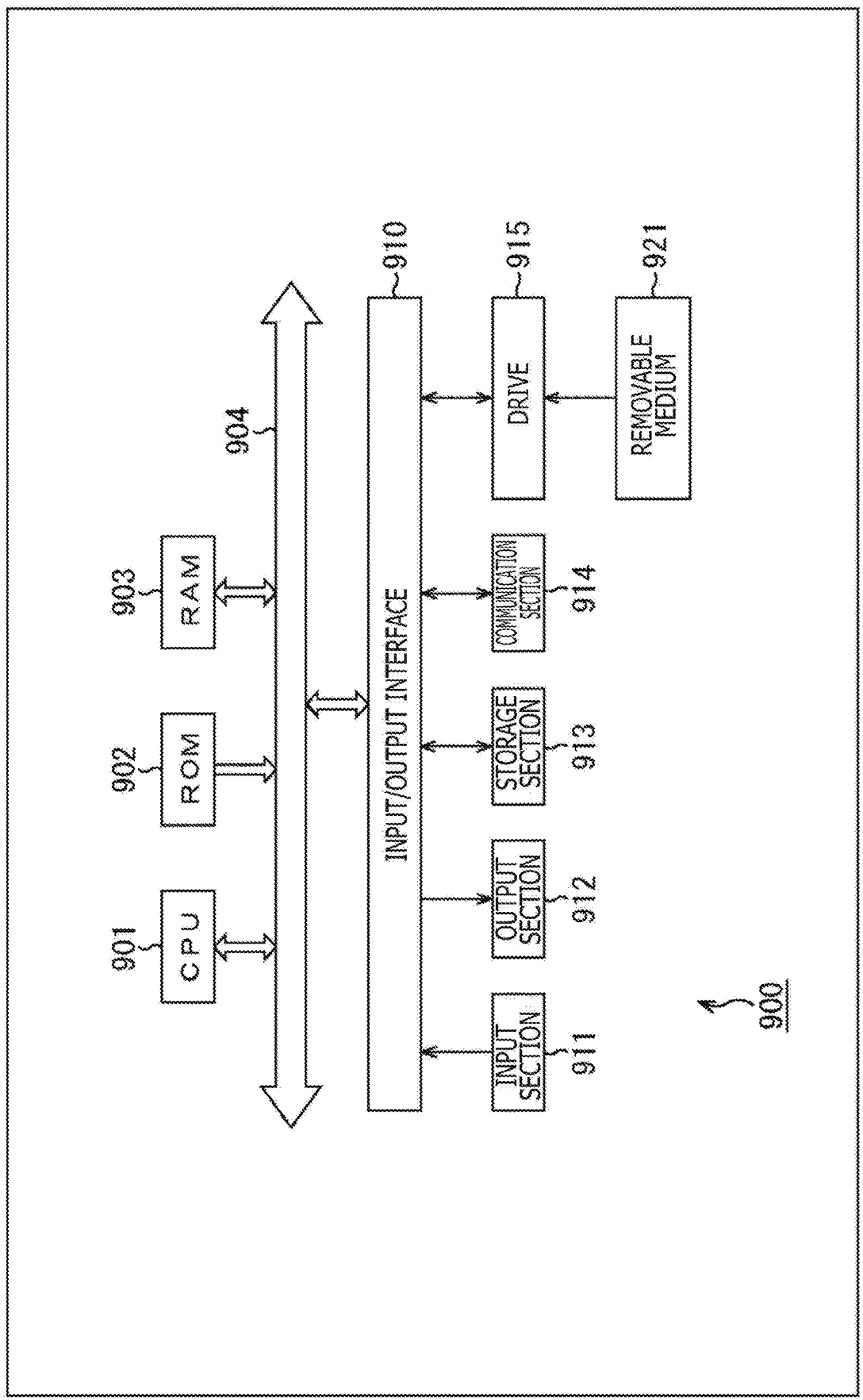
FIG. 15 is a block diagram illustrating an example of a main configuration of a computer.

FIG. 15 is a block diagram illustrating an example of a configuration of hardware of the computer that executes the series of processes described above according to the program.

In a computer 900 illustrated in FIG. 15, a CPU (Central Processing Unit) 901, a ROM (Read Only Memory) 902, and a RAM (Random Access Memory) 903 are connected to each other via a bus 904.

Further, an input/output interface 910 is also connected to the bus 904. An input section 911, an output section 912, a storage section 913, a communication section 914, and a drive 915 are connected to the input/output interface 910.

The input section 911 includes, for example, a keyboard, a mouse, a microphone, a touch panel, an input terminal, and the like. The output section 912 includes, for example, a display, a speaker, an output terminal, and the like. The storage section 913 includes, for example, a hard disk, a RAM disk, a non-volatile memory, and the like. The communication section 914 includes a network interface, for example. The drive 915 drives a removable medium 921 such as a magnetic disk, an optical disc, a magneto-optical disc, or a semiconductor memory.

In the computer configured as above, for example, the CPU 901 loads the program stored in the storage section 913 into the RAM 903 via the input/output interface 910 and the bus 904 and executes the program, through which the above-described series of processes is performed. The RAM 903 also stores data and the like necessary for the CPU 901 to execute various series of processes, as appropriate.

The program to be executed by the computer (CPU 901) can be recorded in, for example, the removable medium 921 serving as a package medium or the like, and applied. In this case, the program can be installed in the storage section 913 via the input/output interface 910 by attaching the removable medium 921 to the drive 915. Further, the program can also be provided via a wired or wireless transmission medium such as a local area network, the Internet, or digital satellite broadcasting. In this case, the program can be received by the communication section 914 and installed in the storage section 913. Additionally, the program can be installed in advance in the ROM 902 or the storage section 913.

<Supplement>

The embodiments of the present technology are not limited to the embodiments described above and various modifications can be made without departing from the scope of the present technology.

For example, the present technology can also be implemented as any configuration included in an apparatus or a system, for example, a processor serving as a system LSI (Large Scale Integration) or the like, a module using a plurality of processors or the like, a unit using a plurality of modules or the like, a set in which another function is further added to a unit, or the like (that is, a partial configuration of an apparatus).

It is noted that in the present specification, the system refers to a collection of a plurality of constituent elements (apparatuses, modules (components), and the like), and it does not matter whether or not all the constituent elements are within the same housing. Therefore, a plurality of apparatuses stored in separate housings and connected via a network, and one apparatus storing a plurality of modules in one housing are, in either case, the system.

Further, the above-described processing sections may be implemented by any configuration as long as the processing sections have the functions described for the respective processing sections. For example, the processing sections may include any circuit, LSI, system LSI, processor, module, unit, set, device, apparatus, system, or the like. Further, the processing sections may be implemented by a multiple combination thereof. For example, the same type of configurations such as a plurality of circuits, a plurality of processors, or the like may be combined or different types of configurations such as a circuit and an LSI may be combined.

Further, for example, the configuration described as one apparatus (or processing section) may be divided and configured as a plurality of apparatuses (or processing sections). Conversely, the configurations described above as a plurality of apparatuses (or processing sections) may be combined and configured as one apparatus (or processing section). Further, needless to say, a configuration other than the above-described configurations may be added to the configuration of each apparatus (or each processing section). In addition, a part of the configuration of one apparatus (or processing section) may be included in the configuration of another apparatus (or another processing section) as long as the configuration and operation as the entire system are substantially the same.

Further, for example, the present technology can be configured as cloud computing in which one function is shared and processed collaboratively among a plurality of apparatuses via a network.

Further, for example, the program described above can be executed in an arbitrary apparatus. In this case, it is sufficient if the apparatus has necessary functions (functional blocks and the like) and is capable of obtaining necessary information.

Further, for example, each of the steps described in the flowcharts described above can be executed by one apparatus or by a plurality of apparatuses in a shared manner. In addition, in a case where one step includes a plurality of processes, the plurality of processes included in this one step can be executed by one apparatus or by a plurality of apparatuses in a shared manner. In other words, a plurality of processes included in one step can also be executed as processes in a plurality of steps. Conversely, processes described as a plurality of steps can also be combined and executed as one step.

In the program executed by the computer, the processes in steps describing the program may be executed in a chronological order in the order described in the present specification. Alternatively, the processes in steps may be executed in parallel, or may be executed individually at necessary timing on occasions of calls or the like. That is, the process in each step may be executed in an order different from the order described above as long as there is no contradiction. In addition, the processes in steps describing this program may be executed in parallel with the processes of another program or may be executed in combination with the processes of another program.

Each of the plurality of present technologies described in the present specification can be implemented independently as a single technology as long as there is no contradiction. Needless to say, the plurality of arbitrary present technologies can also be implemented in combination. For example, a part or all of the present technologies described in one of the embodiments can also be implemented in combination with a part or all of the present technologies described in another embodiment. Further, a part or all of the arbitrary present technologies described above can also be implemented in combination with another technology that is not described above.

It is noted that the present technology can also be configured as follows.

(1)

An image processing apparatus including:

an inverse filter generating section configured to generate, on the basis of an individual-blur amount and a superimposition-blur amount, an inverse filter of a filter configured to transform an input image to be projected by a plurality of projection sections into a projection image projected by the plurality of projection sections, the individual-blur amount indicating a magnitude of optical blur generated in an individual projection image projected by each of the plurality of projection sections, the superimposition-blur amount indicating a magnitude of optical blur generated from superimposition of a plurality of the projection images; and a phase image generating section configured to transform the input image using the inverse filter generated by the inverse filter generating section to generate a phase image.

(2)

The image processing apparatus according to (1), in which the inverse filter generating section is configured to generate the filter such that an error between a value obtained by filtering the input image and the projection image of the input image is minimized, and generate the inverse filter using the generated filter.

(3)

The image processing apparatus according to (2), in which the inverse filter generating section is configured to generate a Wiener filter as the inverse filter.

(4)

The image processing apparatus according to any one of (1) to (3), in which the inverse filter generating section is configured to generate the inverse filter for each of the projection sections.

(5)

The image processing apparatus according to any one of (1) to (4), in which the inverse filter generating section is configured to generate the inverse filter for a representative pixel of the input image.

(6)

The image processing apparatus according to any one of (1) to (4), in which the inverse filter generating section is configured to generate the inverse filter for all pixels of the input image.

(7)
The image processing apparatus according to any one of (1) to (6), in which
the phase image generating section is configured to generate the phase image for each of the projection sections.
(8)
The image processing apparatus according to any one of (1) to (7), in which
the phase image generating section is configured to transform the entire input image using the inverse filter generated by the inverse filter generating section to generate the phase image for the entire input image.
(9)
The image processing apparatus according to any one of (1) to (7), in which
the phase image generating section is configured to transform a part of the input image using the inverse filter generated by the inverse filter generating section to generate the phase image for the part of the input image.
(10)
The image processing apparatus according to (9), in which
the phase image generating section is configured to omit transformation of other parts of the input image.
(11)
The image processing apparatus according to (9), in which
the phase image generating section is configured to transform other parts of the input image such that the individual-blur amount is reduced.
(12)
The image processing apparatus according to any one of (1) to (11), further including:
an individual-blur amount calculating section configured to calculate the individual-blur amount on the basis of a captured image obtained by capturing the individual projection image projected by each of the plurality of projection sections.
(13)
The image processing apparatus according to (12), in which
the individual-blur amount calculating section is configured to project a test image from each of the plurality of projection sections and calculate a PSF (Point Spread Function) as the individual-blur amount for the test image in a captured image obtained by capturing a projection image of the test image.
(14)
The image processing apparatus according to any one of (1) to (13), further including:
a superimposition-blur amount calculating section configured to calculate the superimposition-blur amount on the basis of a captured image obtained by capturing the individual projection image projected by each of the plurality of projection sections.
(15)
The image processing apparatus according to (14), in which
the superimposition-blur amount calculating section is configured to obtain projection coordinates of each pixel of the projection image from the captured image and calculate, from the projection coordinates, the superimposition-blur amount for a part in which the plurality of the projection images is superimposed on each other.
(16)
The image processing apparatus according to any one of (1) to (15), further including:
an imaging section configured to capture the individual projection image projected by each of the plurality of projection sections.
(17)
The image processing apparatus according to any one of (1) to (16), further including:
the plurality of projection sections each configured to project an image.
(18)
The image processing apparatus according to (17), in which
the plurality of projection sections is each configured to project the phase image generated by the phase image generating section.
(19)
The image processing apparatus according to (17) or (18), in which
the plurality of projection sections is each configured to project the image at a mutually shifted position such that the projection image has a higher resolution than the image projected by each of the projection sections.
(20)
An image processing method including:
generating, on the basis of an individual-blur amount and a superimposition-blur amount, an inverse filter of a filter configured to transform an input image to be projected by a plurality of projection sections into a projection image projected by the plurality of projection sections, the individual-blur amount indicating a magnitude of optical blur generated in an individual projection image projected by each of the plurality of projection sections, the superimposition-blur amount indicating a magnitude of optical blur generated from superimposition of a plurality of the projection images; and
transforming the input image using the generated inverse filter to generate a phase image.

REFERENCE SIGNS LIST

100 Projection imaging system, 111 Image processing apparatus, 112 Projection apparatus, 113 Imaging apparatus, 120 Screen, 131 Test image storing section, 132 Projection control section, 133 Imaging control section, 134 Individual-blur amount calculating section, 135 Individual-blur amount storing section, 136 Projection coordinate identifying section, 137 Projection coordinate storing section, 138 Superimposition-blur amount calculating section, 139 Inverse filter designing section, 140 Phase image generating section, 300 Projection imaging system, 400 Projection imaging system, 412 Projection apparatus, 501 Network, 510 Projection imaging apparatus, 512 Projection section, 513 Imaging section, 530 Projection apparatus, 531 Image processing section, 540 Projection imaging apparatus, 900 Computer

The invention claimed is:
1. An image processing apparatus, comprising:
circuitry configured to:
generate a filter to transform an input image into a projection image of a plurality of projection images projected by a plurality of projectors;
generate, based on an individual-blur amount and a superimposition-blur amount, an inverse filter of the generated filter, wherein
the individual-blur amount indicates a magnitude of a first optical blur generated in an individual projection image projected by each of the plurality of projectors, and the superimposition-blur amount indicates a magnitude of a second optical blur generated from superimposition of the plurality of projection images; and transform the input image into a phase image by use of the inverse filter.

2. The image processing apparatus according to claim 1, wherein the circuitry is further configured to:
generate the filter such that an error between a value obtained by a filtering process on the input image and the projection image of the input image is minimized; and
generate the inverse filter by use of the generated filter.

3. The image processing apparatus according to claim 2, wherein the circuitry is further configured to generate a Wiener filter as the inverse filter.

4. The image processing apparatus according to claim 1, wherein the circuitry is further configured to generate the inverse filter for each of the plurality of projectors.

5. The image processing apparatus according to claim 1, wherein the circuitry is further configured to generate the inverse filter for a representative pixel of the input image.

6. The image processing apparatus according to claim 1, wherein the circuitry is further configured to generate the inverse filter for all pixels of the input image.

7. The image processing apparatus according to claim 1, wherein the circuitry is further configured to generate the phase image for each of the plurality of projectors.

8. The image processing apparatus according to claim 1, wherein the circuitry is further configured to:
transform an entirety of the input image by use of the inverse filter; and
generate the phase image for the entirety of the input image based on the transformation of the entirety of the input image.

9. The image processing apparatus according to claim 1, wherein the circuitry is further configured to:
transform a first part of the input image by use of the inverse filter; and
generate the phase image for the first part of the input image based on the transformation of the first part of the input image.

10. The image processing apparatus according to claim 9, wherein the circuitry is further configured to omit transformation of a second part of the input image different from the first part of the input image.

11. The image processing apparatus according to claim 9, wherein
the circuitry is further configured to transform a second part of the input image such that the individual-blur amount is reduced, and
the second part of the input image is different from the first part of the input image.

12. The image processing apparatus according to claim 1, wherein
the circuitry is further configured to calculate the individual-blur amount based on a first captured image, and
the first captured image is based on a capture of the individual projection image projected by each of the plurality of projectors.

13. The image processing apparatus according to claim 12, wherein the circuitry is further configured to:
project a test image from each of the plurality of projectors; and
calculate a Point Spread Function (PSF) as the individual-blur amount for the test image in a second captured image,
wherein the second captured image is based on a capture of a projection image of the test image.

14. The image processing apparatus according to claim 1, wherein
the circuitry is further configured to calculate the superimposition-blur amount based on a captured image, and
the captured image is based on a capture of the individual projection image projected by each of the plurality of projectors.

15. The image processing apparatus according to claim 14, wherein the circuitry is further configured to:
obtain projection coordinates of each pixel of the projection image from the captured image; and
calculate, from the projection coordinates, the superimposition-blur amount for a part in which the plurality of projection images is superimposed on each other.

16. The image processing apparatus according to claim 1, further comprising an imager configured to capture the individual projection image projected by each of the plurality of projectors.

17. The image processing apparatus according to claim 1, further comprising the plurality of projectors,
wherein each of the plurality of projectors is configured to project an image.

18. The image processing apparatus according to claim 17, wherein each of the plurality of projectors is further configured to project the phase image.

19. The image processing apparatus according to claim 17, wherein each of the plurality of projectors is further configured to project the image at a mutually shifted position such that the projection image has a higher resolution than the image projected by each of the projectors.

20. An image processing method, comprising:
generating a filter to transform an input image into a projection image of a plurality of projection images projected by a plurality of projectors;
generating, based on an individual-blur amount and a superimposition-blur amount, an inverse filter of the generated filter, wherein
the individual-blur amount indicates a magnitude of a first optical blur generated in an individual projection image projected by each of the plurality of projectors, and
the superimposition-blur amount indicates a magnitude of a second optical blur generated from superimposition of the plurality of projection images; and
transforming the input image into a phase image by use of the generated inverse filter.

* * * * *